United States Patent
Sayyed et al.

(10) Patent No.: US 11,921,859 B2
(45) Date of Patent: Mar. 5, 2024

(54) SYSTEM AND METHOD FOR MANAGING DEVICE SECURITY DURING STARTUP

(71) Applicant: Dell Products L.P., Round Rock, TX (US)

(72) Inventors: Ibrahim Sayyed, Georgetown, TX (US); Christopher Channing Griffin, Cedar Park, TX (US); Purushothama Rao Malluru, Round rock, TX (US); Chris Edward Pepper, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 336 days.

(21) Appl. No.: 17/518,811

(22) Filed: Nov. 4, 2021

(65) Prior Publication Data
US 2023/0139943 A1    May 4, 2023

(51) Int. Cl.
*G06F 21/57*     (2013.01)
*G06F 21/44*     (2013.01)
*H04L 9/32*      (2006.01)

(52) U.S. Cl.
CPC .......... *G06F 21/575* (2013.01); *G06F 21/44* (2013.01); *H04L 9/32* (2013.01); *G06F 2221/034* (2013.01); *G06F 2221/2111* (2013.01)

(58) Field of Classification Search
CPC ........ G06F 21/44; G06F 21/575; G06F 21/57; G06F 21/86; G06F 2221/034; G06F 2221/2111; G06F 21/2129; H04L 9/32; H04L 63/10; H04L 63/0876; H04L 63/107; H04W 12/63; H04W 12/65; H04W 12/065

See application file for complete search history.

(56) References Cited

U.S. PATENT DOCUMENTS

| | | | | |
|---|---|---|---|---|
| 6,718,461 | B1 * | 4/2004 | Ewertz | G06F 9/4401 |
| | | | | 710/10 |
| 8,700,895 | B1 * | 4/2014 | Naguib | G06F 21/575 |
| | | | | 713/1 |
| 9,032,217 | B1 * | 5/2015 | Brandwine | G06F 21/64 |
| | | | | 713/185 |
| 9,367,688 | B2 * | 6/2016 | Smith | H04W 4/021 |
| 10,097,439 | B1 * | 10/2018 | Cai | H04L 43/50 |
| 10,719,604 | B2 * | 7/2020 | Shivanna | G06F 21/554 |
| 10,855,674 | B1 * | 12/2020 | Geusz | H04L 63/20 |
| 11,375,027 | B1 * | 6/2022 | Ramanathan | H04L 63/0853 |
| 2003/0105971 | A1 * | 6/2003 | Angelo | G06F 21/57 |
| | | | | 709/229 |
| 2004/0003390 | A1 * | 1/2004 | Canter | G06F 8/61 |
| | | | | 717/173 |

(Continued)

*Primary Examiner* — Michael Simitoski
(74) *Attorney, Agent, or Firm* — Womble Bond Dickinson (US) LLP

(57) ABSTRACT

Methods, systems, and devices for transitioning an information handling system (IHS) to a predetermined operating state is disclosed. During the transition, the IHS may obtain data from a variety of sources which may subject it to compromise. To reduce the likelihood that the IHS is compromised, the IHS may evaluate its environment and its own operation to determine its security state. Depending on its security state, the IHS may perform various actions to reduce the likelihood of it being compromised through its transition process.

20 Claims, 16 Drawing Sheets

(56) References Cited

U.S. PATENT DOCUMENTS

| | | | | |
|---|---|---|---|---|
| 2005/0138417 A1* | 6/2005 | McNerney | H04L 63/0876 | 726/4 |
| 2006/0242399 A1* | 10/2006 | Zimmer | G06F 9/4401 | 713/2 |
| 2007/0150559 A1* | 6/2007 | Smith | G06F 21/85 | 709/220 |
| 2007/0291727 A1* | 12/2007 | Hellum | G06F 8/656 | 340/584 |
| 2009/0327678 A1* | 12/2009 | Dutton | G06F 21/575 | 713/2 |
| 2011/0212706 A1* | 9/2011 | Uusilehto | H04M 1/72463 | 455/411 |
| 2015/0200934 A1* | 7/2015 | Naguib | H04L 9/3247 | 713/168 |
| 2016/0173524 A1* | 6/2016 | Lietz | G06F 21/577 | 726/25 |
| 2017/0200026 A1* | 7/2017 | Kanakarajan | H04L 41/28 | |
| 2018/0288045 A1* | 10/2018 | Karunakaran | H04L 63/101 | |
| 2018/0322271 A1* | 11/2018 | Arora | G06F 21/31 | |
| 2019/0042779 A1* | 2/2019 | Agerstam | G06F 21/554 | |
| 2019/0220627 A1* | 7/2019 | LeMasters | G06F 21/54 | |
| 2020/0134163 A1* | 4/2020 | Courtney | G06F 21/57 | |
| 2020/0342110 A1* | 10/2020 | Kreuzer | G06F 21/44 | |
| 2021/0034347 A1* | 2/2021 | Robbins | G06F 8/658 | |
| 2021/0034756 A1* | 2/2021 | Vichare | G06F 21/57 | |
| 2021/0049280 A1* | 2/2021 | Koshy | G06F 21/575 | |
| 2021/0216492 A1* | 7/2021 | Lane | G06F 13/4256 | |
| 2021/0225159 A1* | 7/2021 | Grobelny | G08B 29/16 | |
| 2021/0334382 A1* | 10/2021 | Chhuor | H04W 4/029 | |
| 2022/0131844 A1* | 4/2022 | Sherlock | H04L 63/105 | |
| 2022/0150245 A1* | 5/2022 | August | H04L 67/54 | |
| 2022/0155385 A1* | 5/2022 | Kao | G01R 31/68 | |
| 2022/0255929 A1* | 8/2022 | Rafferty | H04L 63/0876 | |
| 2022/0343095 A1* | 10/2022 | Naqvi | H04L 63/08 | |
| 2023/0315855 A1* | 10/2023 | Strogov | G06F 11/1415 | 726/1 |
| 2023/0379699 A1* | 11/2023 | Oerton | H04W 12/106 | |

\* cited by examiner

SYSTEM AND METHOD FOR MANAGING DEVICE SECURITY DURING STARTUP

FIELD DISCLOSED HEREIN

Embodiments disclosed herein relate generally to device startup. More particularly, embodiments disclosed herein relate to systems and methods to manage startup in a variety of security environments.

BACKGROUND

Computing devices may provide various services. For example, computing devices may host applications that store data, process data, and generate data thereby providing services. Depending on the type of processing performed, various types of services may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
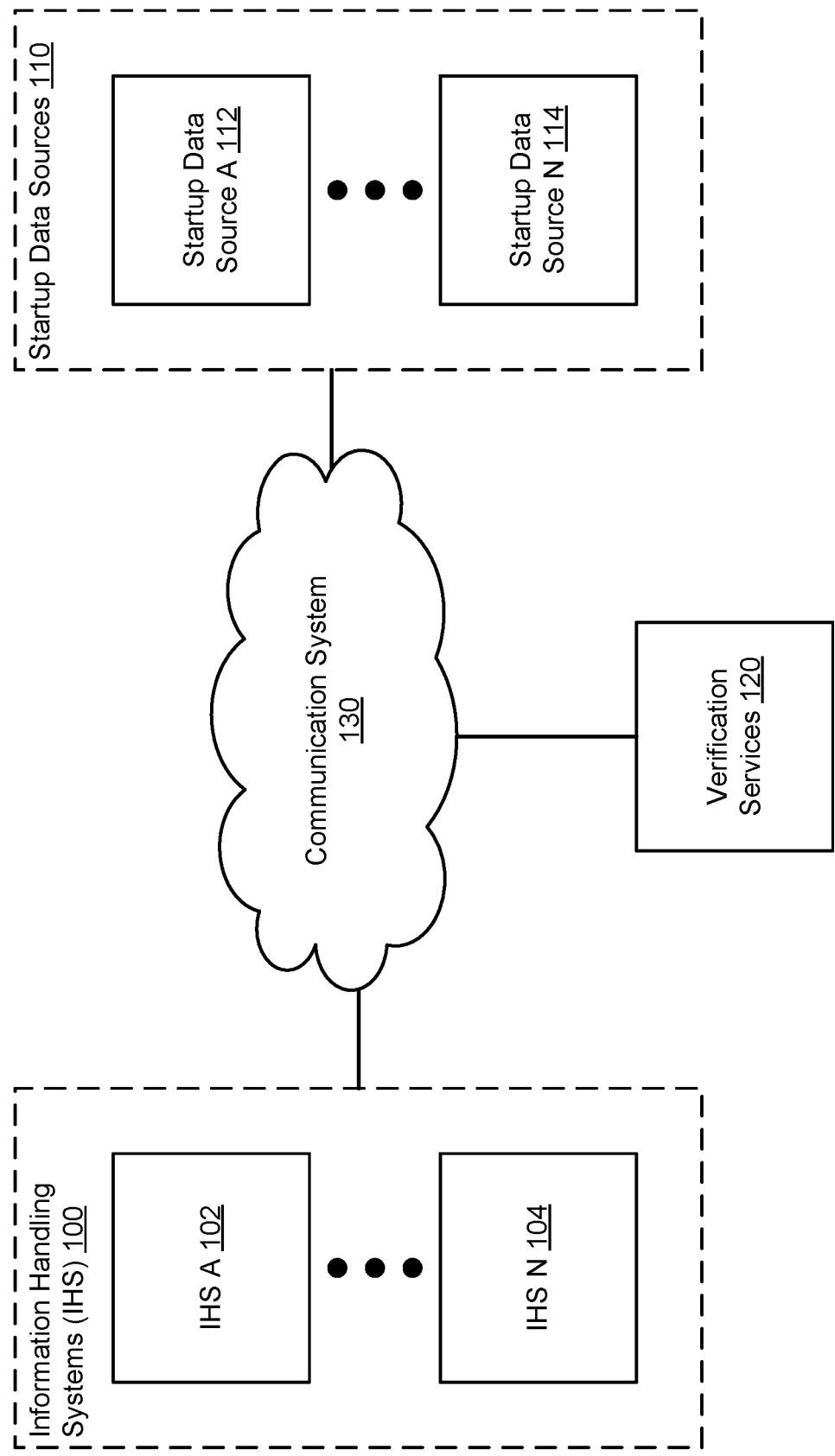
FIG. 1 shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

In general, embodiments disclosed herein relate to methods, systems, and devices for transitioning an information handling system (IHS) to a predetermined operating state. During the transition, the IHS may obtain data from a variety of sources which may subject it to compromise.

To reduce the likelihood that the IHS is compromised, the IHS may evaluate its environment to determine its security state. To determine its security state, the IHS may obtain various indicators of attack and/or indicators of compromise. These indicators may be used to obtain the security state, which may be multidimensional in nature. Depending on its security state, the IHS may perform various actions to reduce the likelihood of it being compromised through its transition process. The number and types of actions may depend on the security state.

The transition process may include, for example, obtaining various operating system, drivers, and/or settings from a variety of remote sources. The transition process may be performed, for example, upon a startup or restart of the IHS. The transition process may be performed, for example, when the IHS is unable to enter the desired operating state due to a corruption and/or loss of all, or a portion, of an operating system, drivers, configuration settings, and/or other data structures. Once the data structures are obtained, the IHS may boot to a management entity using the obtained operating system, drivers, and/or settings.

The actions performed based on the security state to reduce the likelihood of compromise may include, for example, verifying the contents of the operating system, drivers, etc. prior to booting to them, limiting some functionality of an entity to which the IHS boots, preventing the IHS from booting entirely (e.g., when actions by the IHS may not be sufficient to mitigate the security risk associated with its security state), and/or other types of action that may reduce risk of the IHS being compromised through its transition to the predetermined state.

When in the predetermined state, the IHS may provide one or more computer implemented services. The IHS may be unable to provide all, or a portion, of the computer implemented services if it is unable to enter the predetermined operating state. Thus, embodiments disclosed herein may provide a method and system for improving the likelihood that a system is able to provide its services.

In an embodiment, a computer-implemented method for starting operation of an information handling system is provided. The method may include initiating startup of the information handling system to boot to a management entity; prior to booting to the management entity: performing a multidimensional operation state check to identify a security state of the information handling system; making a determination regarding whether the security state indicates that the information handling system is potentially compromised; when it is determined that the information handling system is potentially compromised, performing an action set to manage a security risk indicated by the security state; and when it is determined that the information handling system is not potentially compromised, booting the information handling system to the management entity.

Performing the multidimensional operation state check may include performing a secure boot state check to obtain a first metric; performing a geographic location check to obtain a second metric; performing a physical state check to obtain a third metric; performing a network connectivity check to obtain a fourth metric; and obtaining the security state using at least one of the first metric, the second metric, the third metric, and the fourth metric.

Performing the secure boot state check may include identifying whether a security process for booting to the management entity has been attempted to be disabled.

Performing the geographic location check may include identifying a geographic location of the information handling system; making a comparison of the geographic location to a list of geographic locations; and obtaining the second metric based on the comparison.

Performing the physical state check may include inventorying components of the information handling system; making a comparison of the components to a list of predetermined components; and obtaining the third metric based on the comparison.

Performing the physical state check may include probing a serial peripheral interface bus to which a processor of the information handling system is operably connected to identify component operably connected to the serial peripheral interface bus; making a comparison of the identified components to a list of predetermined components; and obtaining the third metric based on the comparison.

Performing the physical state check may include reading a log hosted by the information handling system to obtain an access list, the log indicating physical access to a chassis of the information handling system; and obtaining the third metric based on the access list.

Performing the network connectivity check may include surveilling one or more networks to which the information handling system is operably connected to identify security standards employed by the one or more networks; and obtaining the fourth metric based on the security standards.

Performing the action set to manage the security risk indicated by the security state may include obtaining startup data comprising components, the startup data being obtained from one or more sources remote to the information handling system; obtaining a component list for the startup data and signatures for the components; making a second determination regarding whether all of the components in the component list are authorized for the information handling system; when the second determination indicates that all of the components in the component list are authorized, performing a verification for the components; and when the second determination indicates that at least one of the components in the component list is not authorized, remediating the components in the components list.

Performing the verification for the components may include making a third determination regarding whether the signatures are valid; when the third determination indicates that the signatures are valid, performing a cryptographic validation of the components in the component list; and when the cryptographic validation of the components in the component list is successful, booting the management entity with the components in the component list.

Performing the verification for the components may also include when the cryptographic validation of the components in the component list is not successful, remediating the components in the components list.

Remediating the components in the components list may include obtaining second startup data from the one or more sources remote to the information handling system, the second startup data may be obtained by: obtaining a manifest from one of the one or more sources remote to the information handling system, the manifest comprising access information for the components in the components list; and using the access information to download an additional copy of the components from the one or more sources remote to the information handling system.

The management entity may include an operating system and at least one driver for a hardware component of the information handling system.

Performing the action set to manage the security risk may include preventing the information handling system from booting to the management entity when the security risk indicates a security risk that cannot be remediated by the information handling system.

Performing the action set to manage the security risk may include booting to the management entity with one or more functionalities of the management entity being disabled.

Performing the action set to manage the security risk may include obtaining multiple indicators of attack on the information handling system; obtaining multiple indicators of compromise on the information handling system; based on the multiple indicators of attack and the multiple indicators of compromise, selecting a threat level; and obtaining a listing of one or more actions of the action set from a repository using the threat level as a key to perform a lookup for the listing.

A non-transitory media may include instructions that when executed by a processor cause the computer-implemented method to be performed.

An information handling system may include the non-transitory media and a processor, and may perform the computer-implemented method when the computer instructions are executed by the process.

Turning to FIG. 1, a block diagram illustrating a system in accordance with an embodiment is shown. The system may include one or more information handling systems (IHSs) 100, one or more startup data sources 110, one or more verification services 120, and a communication system 130. Each of these components is discussed below.

The IHSs 100 may provide any type and quantity of computer implemented services. The computer implemented services may include, for example, database services, instant messaging services, video conferencing services, etc. Different IHSs (e.g., 102, 104) may provide similar and/or different computer implemented services. IHSs 100 may provide the computer implemented cooperatively and/or independently.

To provide these services, IHSs 100 may host applications (not shown) that provide these (and/or other) computer implemented services. The applications (or other types of executing entities) may presume (and/or may require for proper operation of the applications) that IHSs 100 operate in a predetermined manner. The predetermined manner of operation may include, for example, hosting an operating system, drivers, or other types of management entities that mediate, facilitate, or otherwise manage the operation of IHSs 100 in a manner which enables the applications to operate (e.g., by providing abstracted access to hardware resources used in the execution of the applications). If some, or all, of the operating system, drivers, and/or other data structures are corrupted, lost, or otherwise become inaccessible, the IHS may not be able to transition to the desired operating state using only its own data.

To operate in the predetermined manner, IHSs 100 may perform one or more operations to enter the predetermined manner of operation (by changing from other manners of operation to the predetermined manner of operation). These operations may include, for example, performing a boot process from a power-on (or reset or other manner of operation that differs from the predetermined manner of operation to the extent that the applications may not be able to operate) to handing off management of one of IHSs 100 to an operating system or other type of operational management entity that places the IHS into the predetermined manner of operation. The operating system may, for example, provide abstracted access to resources utilized by the applications, manage data storage and data retrieval, and/or perform other actions that allow for applications that provide (all or a portion of) the computer implemented services to execute on the IHS.

For example, consider a scenario where an IHS (e.g., 102) has been shut off. After the IHS is turned on, the IHS may be operating in a startup manner during which the IHS may not be able to support execution of an application (e.g., the application may not be able to successfully execute until the client hosts an operating system). To enter the predetermined manner of operation conducive to execution of applications, the IHS may go through a boot process which may be performed by a type of management entity such as a basic input-output system and/or other type of startup management entity. The startup management entity may perform any number of actions (e.g., a "boot process") to prepare the IHS to begin execution of an operating system, drivers, and/or other components of a management entity.

In an embodiment, the startup management entity obtains information usable to place the IHS in a desired operating state. The information may include, for example, images of operating systems, driver software, applications, configuration settings for hardware and/or software components, etc. Such information may be obtained when various portions of data of the IHSs become corrupted, inaccessible, etc. The information may include other types of information without departing from embodiments disclosed herein. The startup management entity may use the obtained information to, for example, boot the IHS to a desired management entity (e.g., which may include an operating system, one or more drivers, various configurations, etc. that define the operation and management of the IHS). Consequently, even when the IHSs are unable to access certain data, the IHSs may still be able to entered the desired operating system using data from other devices.

In general, embodiments disclosed herein relates to methods, systems, and devices for improving the likelihood of an IHS entering a predetermined operating state. To improve the likelihood of the IHS entering the predetermined operating state, the IHS may perform a multidimensional analysis of its operating condition (and/or the environment in which it is operating) to identify a security state of the IHS prior to attempting to boot to a desired management entity (e.g., using data from remote and/or local sources). Depending on its determined security state, the IHS may perform actions to reduce the likelihood of, for example, the IHS beginning execution of a compromised component, the IHS operating with configuration settings that subject it to potential compromise, and/or the IHS performing actions that diverge from its operation in the predetermined state (e.g., a desired operating state). By doing so, the IHS may be more likely to provide predetermined functionality (e.g., computer implemented services) and reduce the likelihood of the IHS being compromised (e.g., allowing an undesired party to obtain access to data stored in and/or generated by the IHS, hosting applications instantiated by an undesired party, etc.).

When the IHS determines that it is potentially compromised, the IHS may automatically take action to remedy the potential compromise. The actions may include (i) aborting/preventing a boot with the information obtained from remote entities, (ii) performing various verifications of the information obtained from the remote entities (e.g., 110), and/or (iii) obtain additional copies of information when previously obtained copies do not appear to be authentic (e.g., failed a verification operation). By doing so, even when an IHS is subjected to an environment in which it may be compromised, the IHS may still proceed with booting to a management entity (or mitigating risk associated with booting) using information from remote entities.

As part of the process of performing various verifications of the information obtained from the remote entities, an IHS may consult with one or more verification services 120. These services may provide the IHS with information usable to ascertain whether information (e.g., including executable code) corresponds to code (e.g., software that includes computer instructions executable by a processor) that is known to give rise to operation of predetermined entities (e.g., operating systems, drivers, and/or other components of a management entity). For example, the verification services 120 may provide access to keys usable to cryptographically verify whether data obtained from startup data sources 110 correspond to predetermined entities or whether the data obtained (e.g., which may be provided by a malicious attacker rather than a startup data source) may cause undesired functionalities or otherwise cause the operation of the IHS to diverge from the predetermined operation.

For additional details regarding IHSs 100, refer to FIG. 2 and the corresponding description below.

In an embodiment, startup data sources 110 provide startup data distribution services. The startup data distribution may be utilized by any of IHSs 100 to obtain data usable to enter a predetermined operating state. Startup data distribution services may include (i) receiving requests for data from other entities and (ii) providing the requested data to the other entities (e.g., IHSs 100). The data may include, for example, manifests or other data structures that include lists of components of a management entity, access information for the components included in the lists, and/or information (e.g., signatures) usable, in part, to ascertain whether an obtained component is a component that the obtained components is believed to be.

For example, a manifest may specify a list of components such as an operating system image and any number of drivers. The manifest may also specify access information usable to obtain copies of the lists of components. The access information may specify, for example, identifiers of various startup data sources 110 that host copies of the components. The manifest may also include code signatures or other data structures usable to ascertain whether a component (e.g., software instructions) obtained from a startup data source is the same as specified by the manifest. For example, the manifest may include hashes corresponding to different portions of a component. When a component is obtained, corresponding hashes may be calculated and matched to the code signatures to ascertain whether the obtained component is the same as that specified by a list of components included in a manifest.

The startup data sources 110 may include any number of manifests. The manifests may be indexed or otherwise organized to allow manifests that may be of interest to an IHS to be discriminated from other manifests. For example, manifests may be associated with various identifiers and the IHSs may have access to (e.g., store copies of, may retrieve copies from other devices, etc.) copies of identifiers of the manifests that are relevant to them. Consequently, the IHSs may utilize the identifiers to obtain manifests from startup data sources 110 that are relevant to them.

The data may also include any number of copies of components. Any of the startup data sources (e.g., 112, 114) may stores copies of similar and/or different components. Thus, when a IHS obtains a manifest, the IHS may retrieve copies of components from any number of startup data sources 110.

The verification services 120 may provide component verification services. Component verification services may include providing information usable to ascertain whether a component obtained by an IHS should be hosted by the IHS. For example, the verification services 120 may provide access to information regarding certificates for the components, information usable to cryptographically verify that the components have not been compromised, etc.

Any of IHSs 100, startup data sources 110, and verification services 120 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of data processing device or system. For additional details regarding computing devices, refer to FIG. 5.

In an embodiment, communication system 130 includes one or more networks that facilitate communication between IHSs 100, startup data sources 110, verification services 120, and/or other components not illustrated in FIG. 1. The networks may include, for example, wired networks, wireless network, public networks, private network, the Internet, etc.

While illustrated in FIG. 1 as included a limited number of specific components, a system in accordance with an embodiment may include fewer, additional, and/or different components than those illustrated therein.

Figure 2:
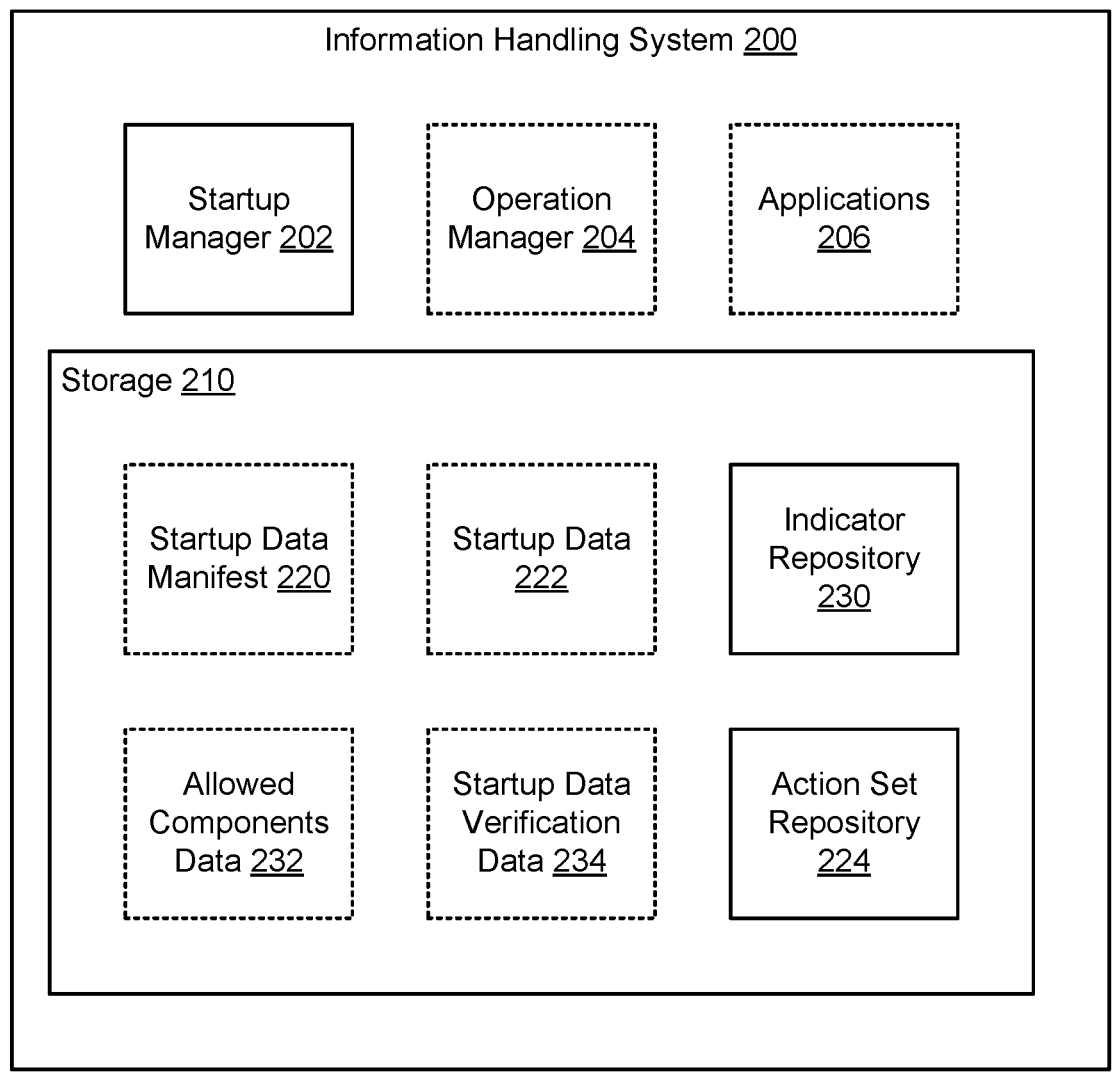
FIG. 2 shows a block diagram illustrating an information handling system in accordance with an embodiment.

Turning to FIG. 2, a diagram of an example IHS 200 in accordance with an embodiment is shown. IHS 200 may be similar to any of IHSs 100. As discussed above, IHS 200 may provide desires services by entering into a predetermined operation state, in addition to performing any number and type of other functionalities. In FIG. 2 various portions of data and entities may not be present on IHS 200 at various points in time. These data structures and entities are illustrated in FIG. 2 with dashed outlining.

To provide the aforementioned functionality, IHS 200 may include startup manager 202, operation manager 204, one or more applications 206, and storage 210. Each of these components is discussed below.

Startup manager 202 may manage the operation of IHS 200 and facilitate management of startup of IHS 200 from power on to booting to operation manager 204. To facilitate management of startup of IHS 200, startup manager 202 may (i) obtain information regarding and operational state of IHS 200 prior to booting to operation manager 204, (ii) use the information to determine a security state of IHS 200, (iii) perform various actions depending on the identified security state of IHS 200 to reduce the likelihood of the IHS booting to a compromised management entity, and (iv) booting to the management entity. When providing its functionality, startup manager 202 may perform all, or a portion, of the methods illustrated in FIGS. 3A-3E.

The information regarding the operational state of IHS 200 may include, for example various indicators of compromise and/or indicators of attack. Any quantity of such information may be collected, stored as part of indicator repository 230 (or may be maintained in an in-memory data structure), and may be used to identify a security state of IHS 200. The information may be obtained from various hardware and/or software components of IHS 200, as well as an environment (e.g., physical, networking, etc.) in which the IHS is positioned.

The various actions may cause IHS 200 to obtain (i) manifests (e.g., startup data manifest 220) from startup data sources, (ii) obtain copies of components from various startup data sources (e.g., startup data 222), (iii) determine whether any of the components are disallowed (e.g., using allowed components data 232) for use by IHS 200, (iv) verify any of the components stored in startup data 222 (e.g., using startup data verification data 234), (v) modify startup data 222 such that various functionalities of operation manager 204 may be disabled and/or restricted, and/or (vi) prevent booting to operation manager 204 entirely if actions performed are unable to sufficiently address the identified security state of IHS 200. Any of these actions may be part of one or more actions sets stored in an action set repository. The actions performed may be selected based on the identified security state of IHS 200. Thus, IHS 200 may perform different actions depending on its security state.

Once booted, operation manager 204 may manage the operation of IHS 200. Operation manager 204 may include, for example, an operating system, drivers, and/or other entities through which applications 206 may provide all, or a portion of their functionality. Operation manager 204 may be booted to using startup data 222. Thus, if startup data 222 includes malicious code, undesired code, unauthorized code, etc., then operation manager 204 may operate in a manner that diverges from a desired manner. To reduce this possibility, as discussed above, startup manager 202 may perform various actions to improve the likelihood of IHS operating in a predetermined manner.

Applications 206 may include any type and quantity of application that may provide any type and quantity of computer implemented services. When providing their functionalities, applications 206 may utilize the functionality of operation manager 204 (e.g., to access computing resources such as processor cycles, transitory storage space, etc.). Thus, if operation manager 204 does not operate in a predetermined manner, then applications 206 may also operate in a manner that diverges from a desired and/or expected manner. The divergence of applications 206 and/or operation manager 204 may cause IHS 200 to not provide (or provide in a compromised manner) all, or a portion, of computer implemented services that are to be provided by IHS 200.

In an embodiment, one or more of startup manager 202, operation manager 204, and/or applications is implemented using a hardware device including circuitry. The hardware device may be, for example, a digital signal processor, a field programmable gate array, or an application specific integrated circuit. The circuitry may be adapted to cause the hardware device to perform the functionality of startup manager 202, operation manager 204, and/or applications. Startup manager 202, operation manager 204, and/or applications may be implemented using other types of hardware devices without departing embodiment disclosed herein.

In one embodiment, one or more of startup manager 202, operation manager 204, and/or applications is implemented using a processor adapted to execute computing code stored on a persistent storage that when executed by the processor performs the functionality of startup manager 202, operation manager 204, and/or applications discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including startup data manifest 220, startup data 222, indicator repository 230, allowed components data 232, startup data verification data 234, and action set repository. Each of these data structures is discussed below.

Startup data manifest 220 may include one or more data structures that include information usable to obtain and/or verify various portions of startup data 222. Storage 210 may store any type and quantity of startup data manifest 220.

Startup data 222 may include one or more data structures that include information usable to boot to operation manager 204. Various portions of startup data 222 may be obtained from remote sources such as, for example, remote data sources.

Indicator repository 230 may include one or more data structures that include information usable to obtain a security state of information handling system. Indicator repository 230 may include any number and types of indicators of compromise and/or indicators of attack. All or a portion of these indicators may be used to ascertain the security state of IHS 200.

In an embodiment, indicator repository 230 includes information regarding (i) whether a secure boot process has been attempted to be disabled (and/or is disabled), (ii) a geographic location of IHS 200 and/or whether the geographic location indicates compromise and/or threat of attack (e.g., by comparing the geographic location to a list of geographic locations), (iii) a physical state of IHS 200 including, for example, whether any physical components of IHS 200 have been replaced, whether an interior of a chassis of IHS 200 has been accessed, etc., and/or (iv) a network environment in which IHS 200 resides such as, for example, whether a network to which IHS 200 may connect is public, security protocols implemented by the network, etc.

Allowed component data 232 may include one or more data structures that include information regarding components that are allowed to be hosted by IHS 200. For example, allowed component data 232 may include a list of components which IHS 200 is allowed to host (e.g., a white list), a list of components that IHS is not allowed to host (e.g., a black list), general categorizations of components and whether IHS 200 is allowed to host them, operational characteristics (e.g., require read access and/or write access for data, require network communications access, require use of specialized hardware components such as graphic processing units, etc.) of components and whether IHS 200 is allowed to host components that exhibit the operational characteristics, and/or other information usable by startup manager 202 to discriminate various components and/or functions thereof that may be allowed and/or not allowed to be performed by operation manager 204.

Startup data verification data 234 may include one or more data structures that include information usable to verify components of startup data 222. For example, startup data verification data 234 may include data usable to cryptographically verify all, or a portion, of the components of startup data 222. The contents of startup data verification data 234 may be obtained from, for example, one or more verification services.

Actions set repository 224 may include one or more data structures that include information regarding actions sets to be performed by startup manager 202. The action sets may include any number and types of actions to be performed by startup manager 202. All, or a portion, of the actions sets may be keyed to security states of IHS 200 such that the security state may be used to identify some of the actions sets (e.g., one or more) to be performed by startup manager 202.

The data structures stored in storage 210 may be implemented using, for example, lists, tables, unstructured data, trees, databases, etc. While illustrated in FIG. 2 as being stored locally, any of the data structures may be stored remotely and may be distributed across any number of devices without departing from embodiments disclosed herein. Additionally, any of the data structure may include different, less, and/or additional information without departing from embodiments disclosed herein.

While illustrated in FIG. 2 as including a limited number of specific components, an IHS in accordance with an embodiment may include fewer, additional, and/or different components than shown herein.

As discussed above, the components of FIG. 1 may perform various methods to startup information handling systems thereby entering the IHSs into predetermined operating states. FIGS. 3A-3E illustrate examples of methods that may be performed by the components of FIG. 1. For example, a startup manager of an information handling system may perform all or a portion of the methods. Other components of FIG. 1 may perform all, or a portion, of the methods disclosed herein. In the diagrams discussed below and shown in FIGS. 3A-3E, any of the operations may be repeated, performed in different orders, and/or performed in parallel with or in a partially overlapping in time manner with other operations.

Figure 3A:
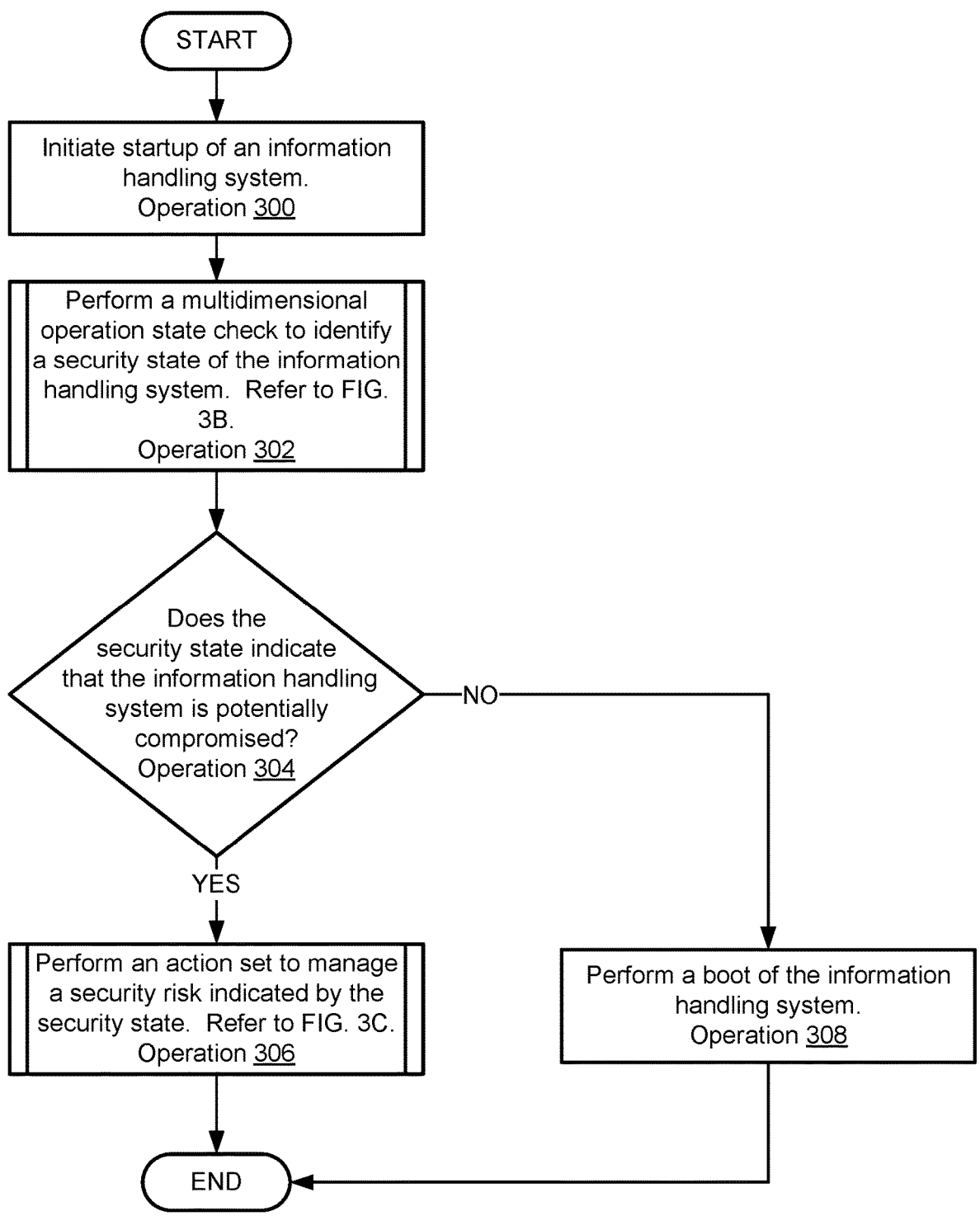
FIG. 3A shows a flow diagram illustrating a method of transitioning an information handling system to a predetermined state in accordance with an embodiment.

Turning to FIG. 3A, a flow diagram illustrating a method of starting an information handling system in accordance with an embodiment is shown. The method illustrated in FIG. 3A may be performed when an IHS has been powered on and/or restarted for any reason (or may be performed at other times).

At operation 300, startup of an IHS is initiated. Startup may be initiated by beginning execution of a startup manager on the IHS. The startup may be initiated in response to any or no condition at all.

Starting up the IHS may include booting the IHS to a management entity. The operation of the management entity may be defined by operation data. The IHS may have access to (e.g., a copy may be stored in the IHS) all, or a portion, of the startup data when startup is initiated. The IHS may not have access to a portion, or all, of the startup data when the startup is initiated.

When the startup is initiated, the startup manager may not be aware of a security state of the IHS. Thus, unless proven to the contrary, the startup manager may presume that security measures should be taken to reduce the likelihood of the IHS being compromised through its startup.

At operation 302, a multidimensional operation state check of the IHS is performed to identify a security state of the IHS. The multidimensional state check may include identifying any number and type of indicators of attack and indicators of compromise. These indicators may be used with a set of rules or other rubric to identify the security state of the IHS.

Figure 3B:
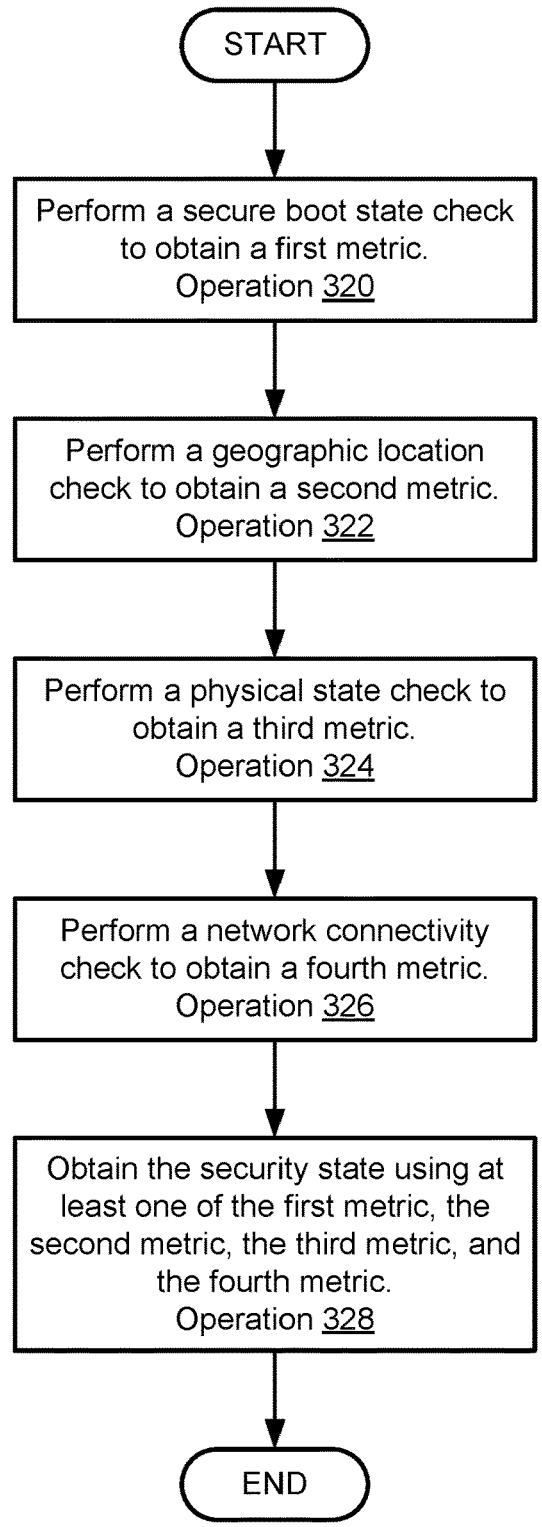
FIG. 3B shows a flow diagram illustrating a method of performing an operating state check in accordance with an embodiment.

In an embodiment, the security state of the IHS is identified by performing the method illustrated in FIG. 3B. The security state may be identified via other methods without departing from embodiments disclosed herein.

At operation 304, it is determined whether the security state indicates that the IHS is potentially compromised. Generally, the security state may indicate whether (i) the IHS is not at risk of compromise or (ii) a degree of risk of the compromise (if a risk of compromise exists). For example, the security state may be one of none, low, medium, and high. In an embodiment, the security state is multidimensional. The security state may include a security dimension corresponding to each indicator of attack and/or indicator of compromise obtained in operation 302. Thus, the security state may include multiple none, low, medium, and/or high indicators corresponding to different dimensions. If any of the dimensions indicate a threat of compromise (e.g., other than indicating low), then it may be determined that the security state indicates a potential of compromise of the IHS. Otherwise, it may be determined that the security state does not indicate a potential of compromise of the IHS.

If it is determined that the IHS is potentially compromised, then the method may proceed to operation 306. Otherwise, the method may proceed to operation 308.

In operation 306, an action set is performed to manage a security risk indicated by the security state. The action set may include any number and types of actions. The action set may be obtained by using the security state as a key for a repository in which various actions sets, keyed to corresponding security states, are stored. The action set may (i) prevent a boot to a management entity from being performed, (ii) limit functionality of a management entity post boot, (iii) obtaining various portions of startup data from various locations, (iv) perform various verification actions for startup data, and/or (v) otherwise take action to limit the potential for booting the IHS to a compromised management entity.

Figure 3C:
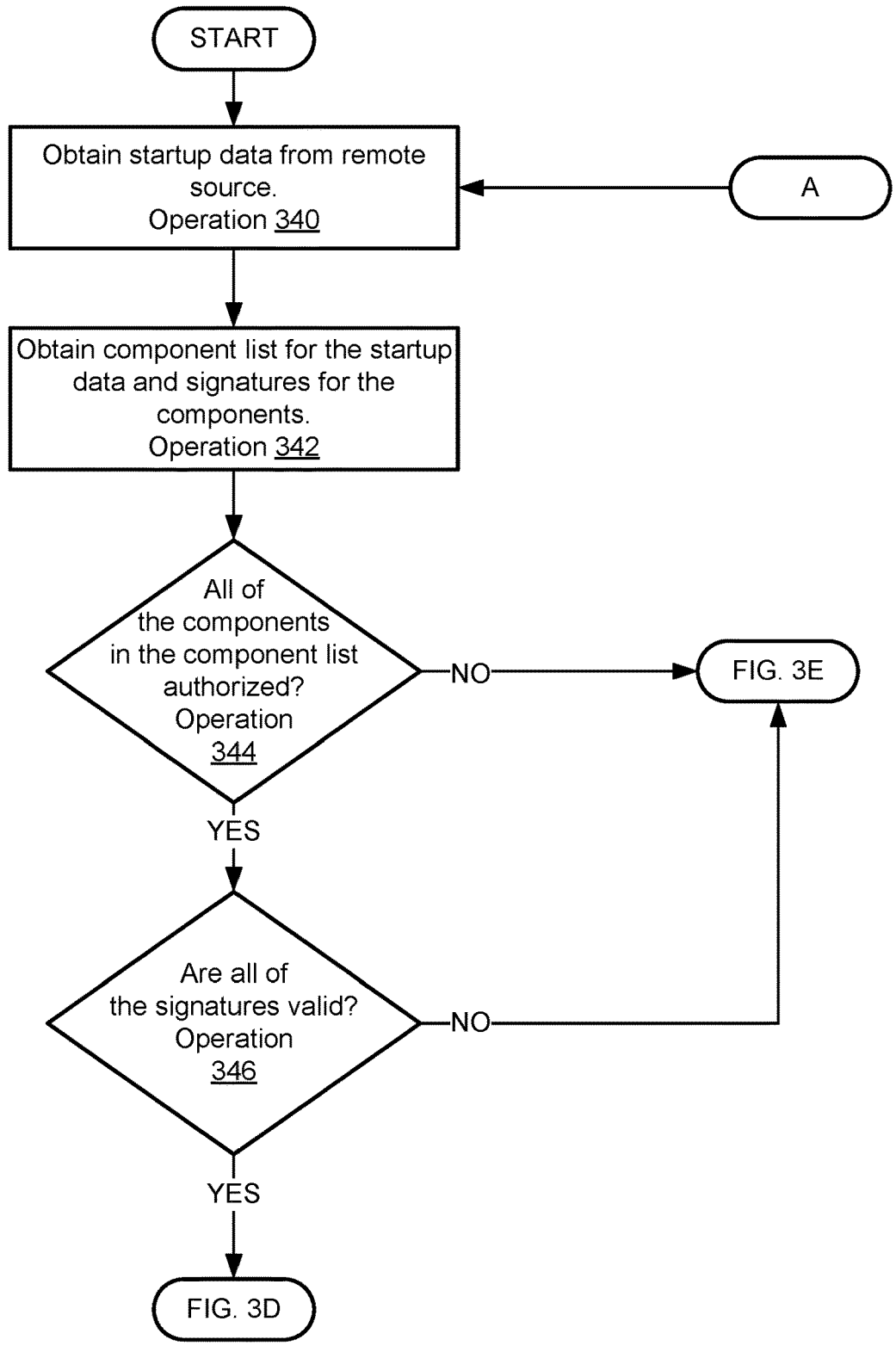
FIG. 3C shows a flow diagram illustrating a method of performing an action set in accordance with an embodiment.

In an embodiment, the action set is performed via the method illustrated in FIG. 3C. The action set may be performed via other methods without departing from embodiments disclosed herein.

The method may end following operation 306.

Returning to operation 304, the method may proceed to operation 308 following operation 304 when it is determined that the security state does not indicate that the IHS is potentially compromised.

At operation 308, a boot of the IHS is performed. The boot may be performed by, for example, beginning execution of various components of a management entity such as an operating system and drivers. Startup data may include software instructions corresponding to these components.

Once booted, the management entity may manage operation of the IHS.

The method may end following operation 308.

Turning to FIG. 3B, a flow diagram illustrating a method of obtaining a security state of an IHS in accordance with an embodiment is shown.

At operation 320, a secure boot state check of the IHS is performed to obtain a first metric. The secure boot state check may include determining whether a security process for booting the IHS has been attempted to be disabled. The secure boot state check may be performed, for example, by reading logs and/or checking configuration settings for the security process. The security process may limit to which entities an IHS may be booted. For example, the security process may require that code corresponding to an entity to which the IHS is to be booted be cryptographically verified (and/or otherwise investigated prior to boot).

The first metric may specify a positive or negative outcome of the secure boot state check (e.g., pass or fail). The negative outcome may be specified by the first metric when it is determined that the security process has been attempted (regardless of whether successful) to be disabled. Malicious software and/or other entities may attempt to do so to compromise operation of a management entity by adding code to startup data that changes that operation of a management entity.

At operation 322 a geographic location check is performed to obtain a second metric. The geographic location check may be performed by comparing a geographic location of the IHS to a white list and/or black list of geographic locations. The list may be maintained locally and/or remotely.

The second metric may specify a positive or negative outcome of the geographic location check (e.g., pass or fail). The negative outcome may be specified by the second metric when it is determined that the geographic location is not specified by the white list and/or is specified by the black list. The aforementioned lists may be specified at any level of granularity.

At operation 324, a physical state check of the IHS is performed. The physical state check may include comparing an inventory of hardware components of the IHS to a list of the hardware components (e.g., which may be prepared prior to the boot such as prior to when the IHS was last shutdown and/or restarted). The list may be stored locally and/or remotely. The physical state check may also include reading logs that specify physical access to various components positioned inside of a chassis and/or general access to a chassis of the IHS. Reading the logs may provide for hardware intrusion detection of the IHS. If the hardware of the IHS is intruded upon, the IHS may be compromised in a manner which it cannot resolve on its own. For example, if a compromised piece of hardware is added to the IHS, then the IHS may be unable to operate in a desired manner by virtue of the operation of the compromised piece of hardware.

The third metric may specify a positive or negative outcome of the physical state check (e.g., pass or fail). The negative outcome may be specified by the third metric when it is determined that the IHS is hosting a hardware component not included in the list and/or determining that the logs indicate physical access of one more hardware components of the IHS.

At operation 326, a network connectivity check of the IHS is performed to obtain a fourth metric. The network connectivity check may include investigating a network environment in which the IHS resides. For example, the IHS may ascertain whether it has general access to the Internet and/or private networks, or is required to utilize a public network (or network not included on a white list and/or blacklisted) to access the Internet and/or a private network (e.g., that is whitelisted and/or not blacklisted). The network connectivity check may also include identifying a degree of security provided by the public network such as, for example, whether a captive portal is used for access, whether wireless security for the network is enabled, whether another entity can verify the security provided by the wireless network, etc. The network connectivity check may be used to identify network induced vulnerability by, for example, Public unsafe networks. Public unsafe networks may allow for a number of types of attacks on an IHS to be performed. For example, an entity operably connected to the IHS via the Public unsafe networks may intercept requests for data (e.g., components) by the IHS and spoof a response to the request that includes compromised data. In this manner, an IHS may believe that it has responsibly obtained requested data but in fact has obtained compromised data.

The fourth metric may specify a positive or negative outcome of the network connectivity check (e.g., pass or fail). The negative outcome may be specified by the third metric when it is determined that the IHS must access a public network and/or the public network does not provide a desired level of security. For example, if the public network requires that a captive portal be used to provision access, then the fourth metric may specify the negative outcome.

While the first through the third metrics have been described as specifying positive or negative outcomes, it will be appreciated that these metrics may specify outcomes with different levels of granularity (e.g., a ranking on a scale of 1-10, multiple rankings for different characteristics of each of these checks, etc.). Additionally, while described with respect to four checks and four metrics, any number of checks may be performed and any number of metrics may be obtained.

At operation 328, the security state is obtained using, at least, one of the first metric, the second metric, the third metric, and the fourth metric. The security state may be obtained by using one or more of the metrics as a key to lookup the security state from a list of security states. For example, a list specifying security states for various combinations of metrics with corresponding values may be used to perform the lookups. The contents of the list may be specified, for example, by an administrator and/or may be heuristically determined. For example, when a compromise of an IHS management entity is identified, the corresponding metrics may be identified. These metrics and the compromise may be used to add an entry to the list that allows future corresponding metrics to be used to lookup the security state (e.g., of being compromised). Additionally, an action set repository may be updated with an action set keyed to the security state, with the action set including actions that may have prevented the management entity from being compromised and/or otherwise limiting risk to the IHS. The security state may be obtained via other methods without departing from embodiments disclosed herein.

The method may end following operation 328.

Turning to FIG. 3C, a flow diagram illustrating a method of performing an action set in accordance with an embodiment is shown.

At operation 340, startup data from a remote source is obtained. The startup may include a manifest. The manifest may be obtained by requesting it from the remote source. The remote sources may send the manifest in response to the request. The request may include an identifier or other indicator usable to identify the manifest. For example, the request may include an identifier of the IHS and/or of a management entity to be hosted by the IHS after completing a boot.

The startup data may also include any number of components. The components may be hosted by remote sources. The manifest may include access information for otherwise allow access to the components. The components may include, for example, an image of an operating system and/or one or more drivers.

At operation 342, a component list for the startup data and signatures for the components are obtained. The components list and signatures may be included with or may otherwise be obtainable with information from the manifest. For example, the manifest may specify access information for the components list and/or the signatures.

At operation 344, it is determined whether the components in the component list are authorized. The determination may be made by comparing the components in the component list to allowed components data which may specify components that are allowed to be hosted by the information handling system.

The determination may also be made by, for example, querying a verification service for each component. The verification service queried may indicate whether a component is authorized.

Figure 3D:
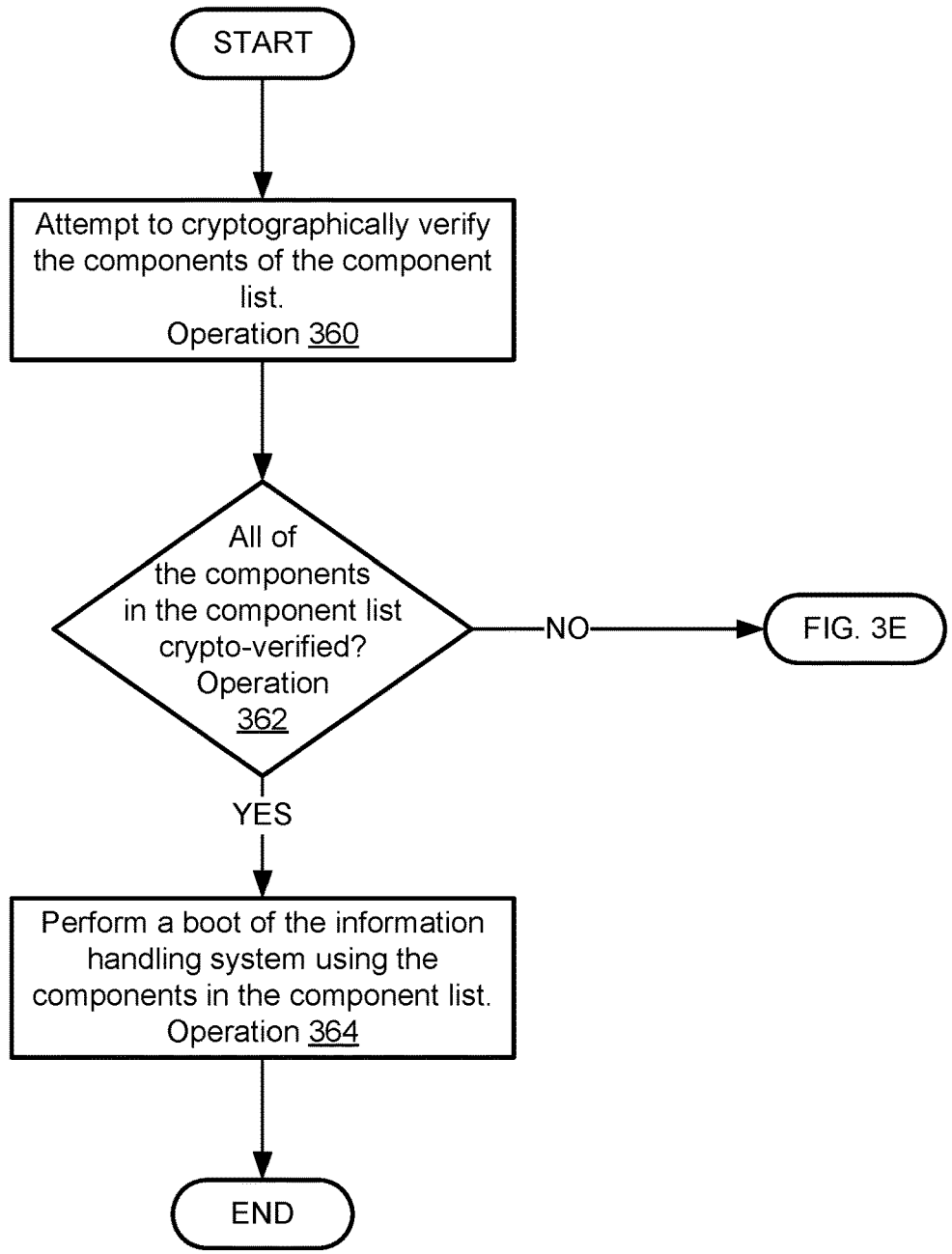
FIG. 3D shows a first continuation of the flow diagram of FIG. 3C in accordance with an embodiment.
Figure 3E:
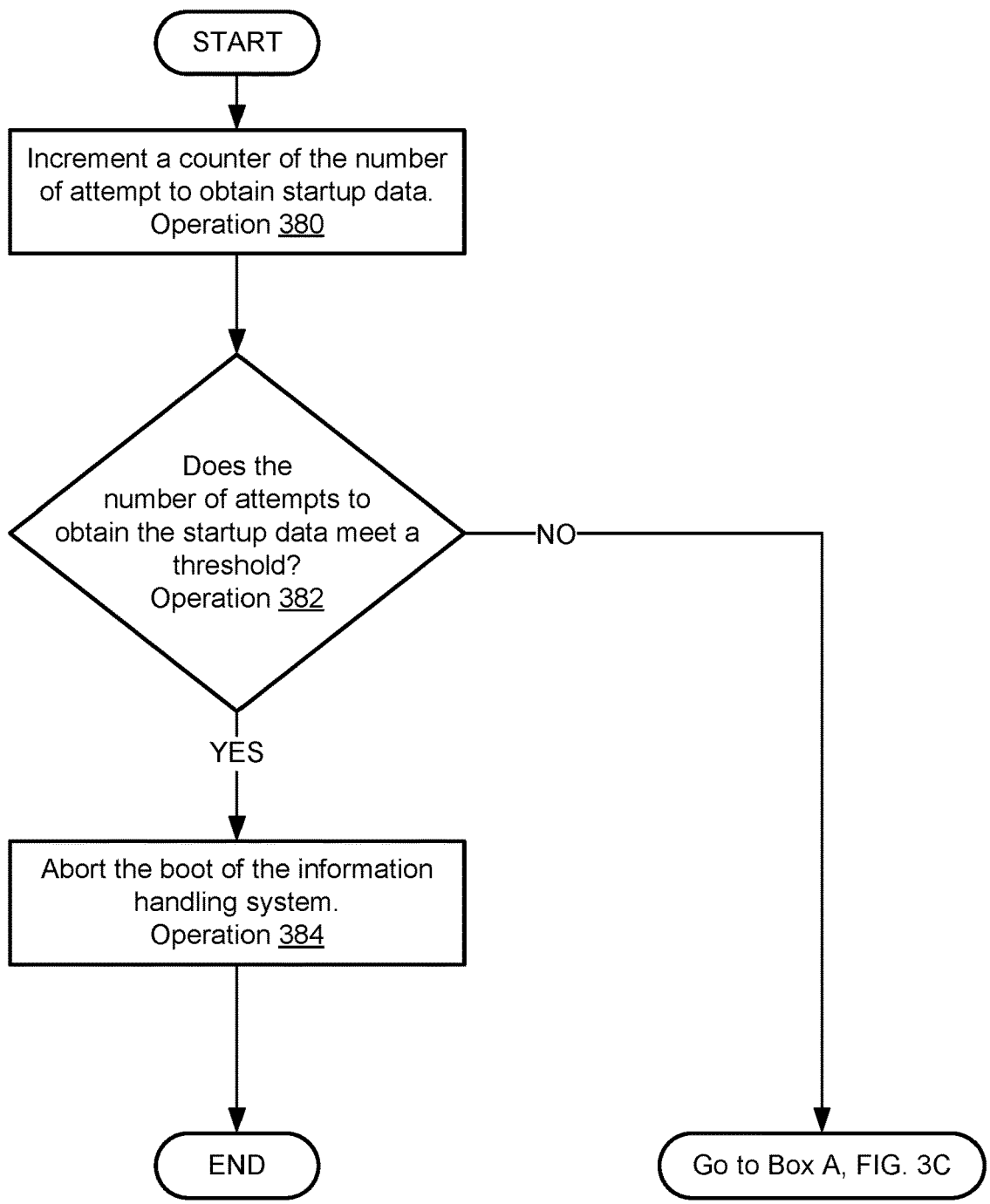
FIG. 3E shows a second continuation of the flow diagram of FIG. 3C in accordance with an embodiment.

The method may proceed to FIG. 3E if it is determined that at least one of the components is not authorized. Otherwise, the method may proceed to operation 346.

In operation 346, it is determined whether all of the signatures are valid. The validity of the signatures may be determined by, for example, verifying a certificate time stamp used for the signatures. The certificate time stamp may indicate a period of validity for the signatures, and the time stamps associated with the signatures may be compared to the period of validity to determine whether the signatures are valid.

The method may proceed to FIG. 3E if it is determined that at least one of the signatures is not valid. Otherwise, the method may proceed to FIG. 3D.

FIGS. 3D and 3E may show flow diagrams of continuations of the method shown in FIG. 3C.

Turning to FIG. 3D, to which the method may proceed when all of the components and signatures are verified, at operation 360, the components of the component list are attempted to be cryptographically verified. The components may be attempted to be cryptographically verified by obtaining authentication data for the components from a verification service, performing calculations on various portions of the components (e.g., calculating hashes, checksums, etc.), and comparing the calculations to the authentication data (e.g., gold data for the calculations) to determine whether the components can be cryptographically verified.

At operation 362, if any of the components of the components list cannot be cryptographically verified (e.g., the calculations do not match the authentication data), then the method may proceed to FIG. 3E. Otherwise the method may proceed to operation 364.

At operation 364, a boot of the information handling system is performed using the components in the component list. The boot may be performed, in part, by beginning execution of these components and terminating execution of a startup management entity.

The boot may also be performed by, for example, modifying the startup data prior to performing the boot. For example, depending on the security state, the startup data may be modified to limit functionality of one or more components and/or prevent execution of one or more components.

In an embodiment, the boot is entirely prevented. For example, the boot may be entirely prevented when the security state indicates that the IHS is outside of a predetermined area and/or a hardware component has been replaced or a chassis has been opened.

In an embodiment, the startup data is modified to limit functionality when the security state indicates that a secure boot process has been disabled. For example, the startup data may be modified so that the management entity may enter a repair state or other state that is less likely to allow third parties to leverage a compromise of the IHS and/or improve the ability of the IHS to remediate its compromise.

In an embodiment, the startup data is subjected to additional verification (e.g., authentication data at a higher level of granularity may be obtained) prior to being booted. For example, supplementary authentication data may be obtained. The supplementary authentication data may subject additional portions of the components to cryptographic verification prior to being allowed to be hosted by the IHS.

The method may end following operation 364.

Turning to FIG. 3E, when it is determined that some of the downloaded components of the startup data may be compromised, not authentication, etc., then at operation 380, a counter for the number of attempts to obtain the startup data may be incremented.

At operation 382, it is determined whether the number of attempts to obtain the startup data specified by the counter meets a threshold. The threshold may specify the maximum the number of times that the startup data may be attempted to be obtained before the IHS will be determined to be in an irremediable, compromised state. The threshold may be, for example, three attempts (or another finite number). The number may be specified with a rate rather than a finite number (e.g., 3 times per hour).

If it is determined that the number of attempts meets the threshold (e.g., exceeds the maximum), then the method may proceed to operation 384. Otherwise the method may return to Box A in FIG. 3C, where the process of obtaining and verifying components may be repeated.

At operation 384, the boot of the information handling system is aborted. Aborting the boot may prevent the information handling system from being booted using the startup data.

The method may end following operation 384.

Turning to FIGS. 4A-4H, diagrams of performing a startup of IHS 400 in accordance with an embodiment is shown. In the figures, actions performed by various components are emphasized with numbered blocks (e.g., 1-4) and interactions such as data transfers or communications between components are shown with dashed lines terminating in arrows.

Figure 4A:
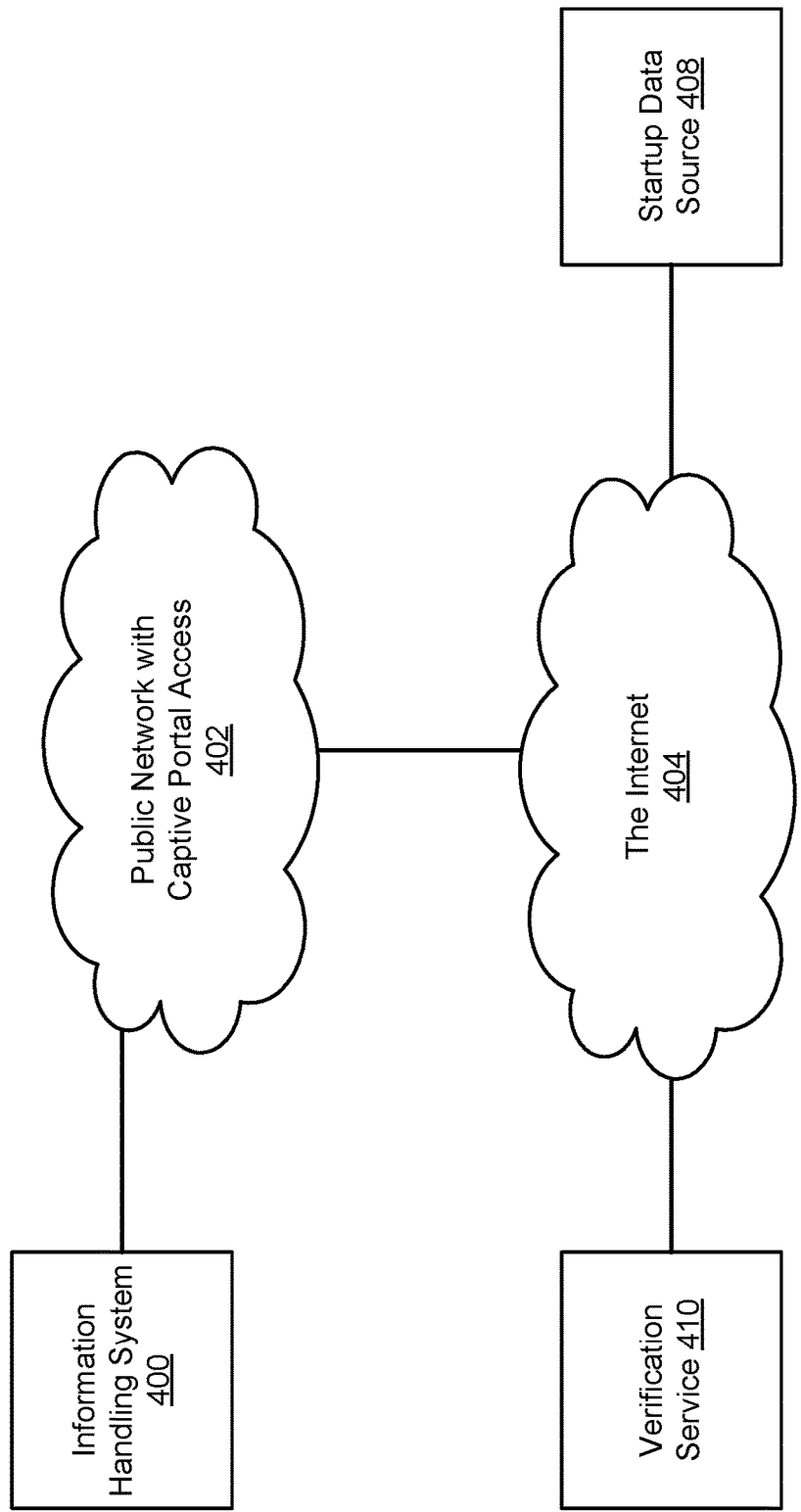
FIGS. 4A-4H show diagrams illustrating an information handling system startup in accordance with an embodiment.

Turning to FIG. 4A, consider a scenario in which IHS 400 is away from any private network and may only obtain network access through public network with captive portal access 402. After IHS 400 is restarted, it may need to obtain and use startup data to boot to a management entity. To do so, it may need to access startup data source 408 which is operably connected via the Internet 404.

Figure 4B:
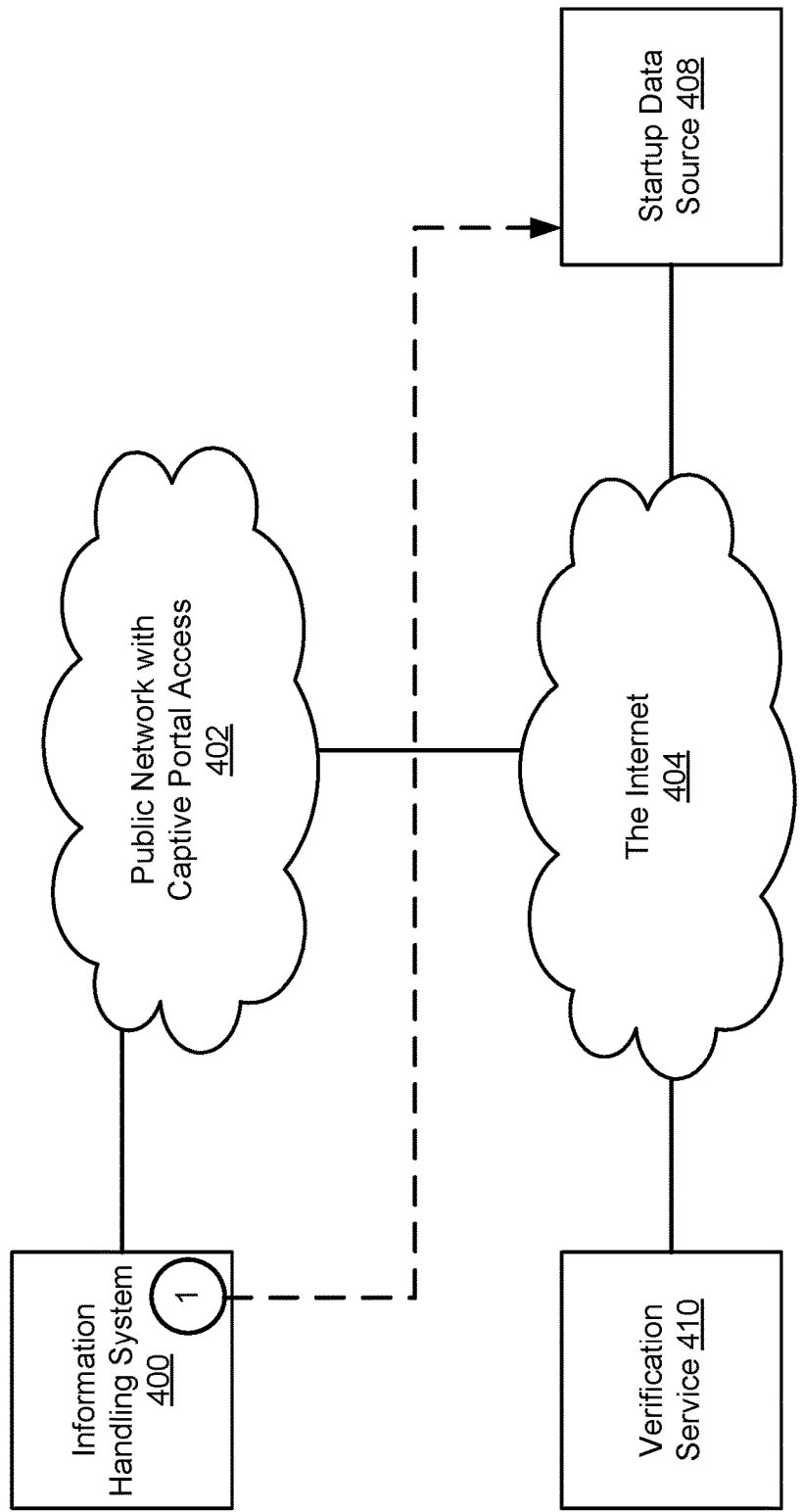

Turning to FIG. 4B, a startup manager of IHS 400 determines that, based on its network environment, IHS 400 is in a moderate security state such that any data that it obtains from remote sources should be subjected to a higher level of scrutiny. IHS 400 determines the security state based on its operable connection to public network with captive portal access 402.

Figure 4C:
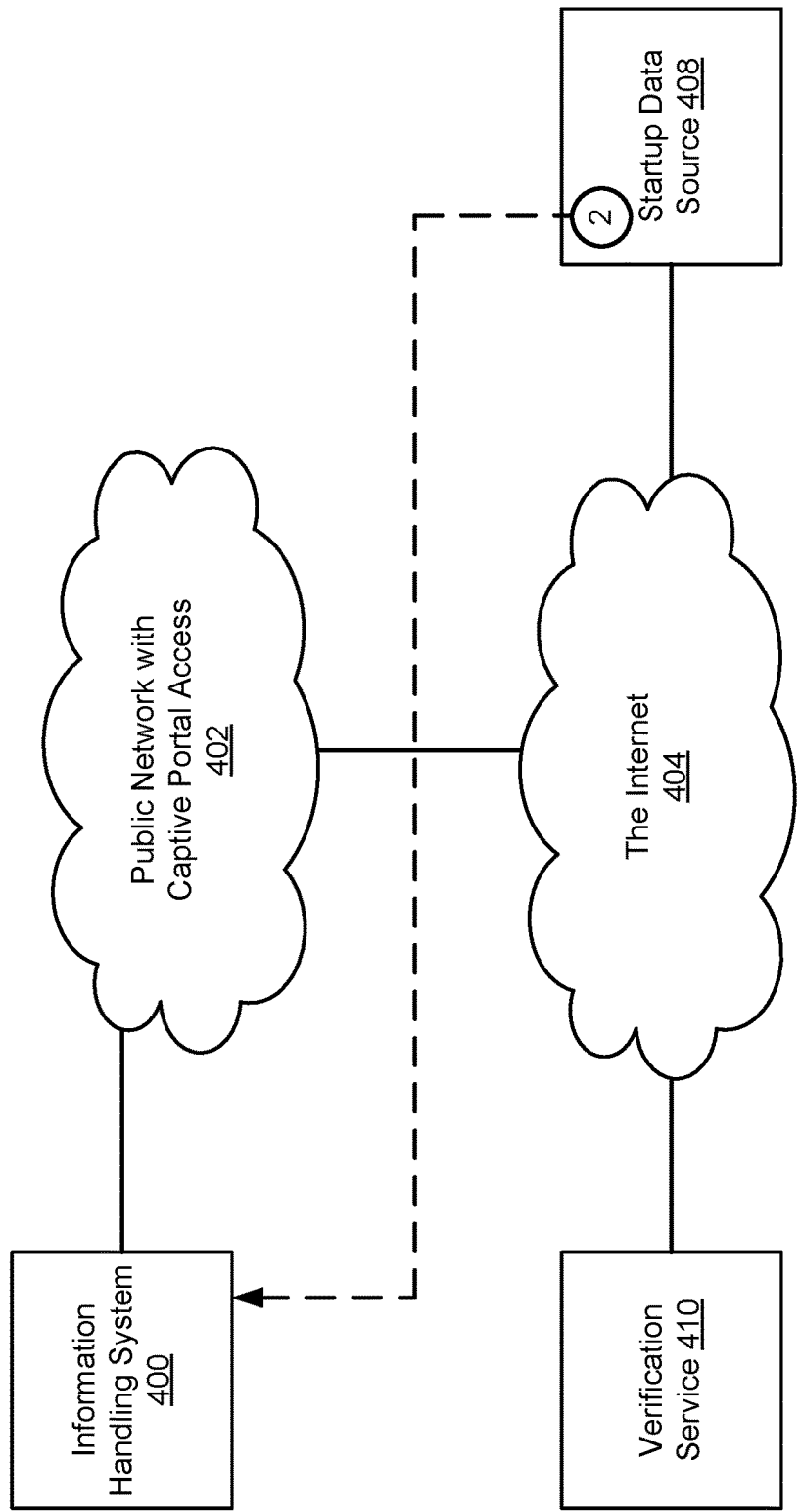

At block 1, IHS 400 sends a request for a manifest to startup data source 408. Turning to FIG. 4C, at block 2, startup data source 408 provides IHS 400 with a manifest.

Using the manifest, IHS 400 identifies that it needs a copy of an operating system and a driver. IHS 400 determines that startup data source 408 stores a copy of the driver and operating system based on information included in the manifest.

Figure 4D:
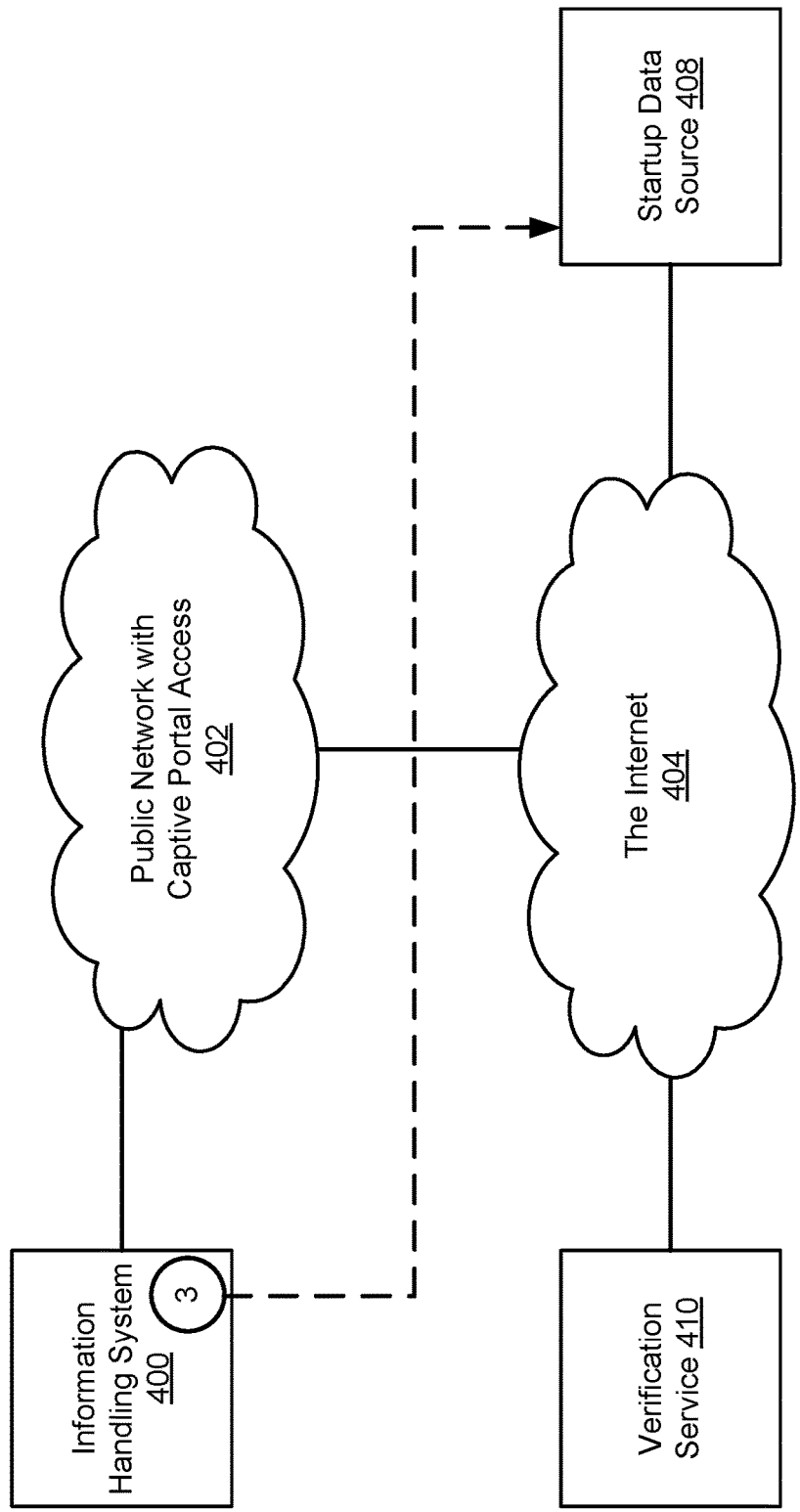
Figure 4E:
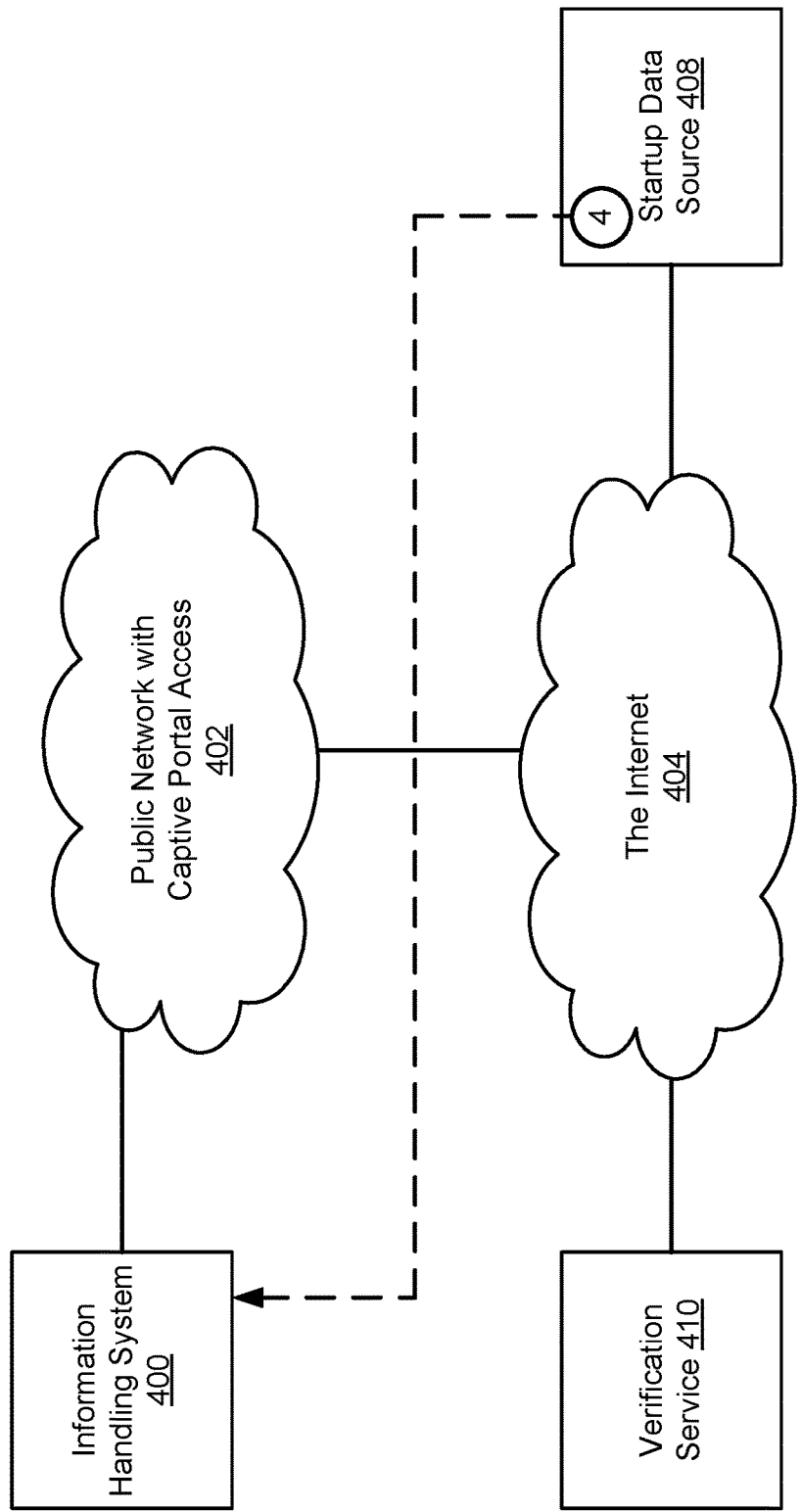

Turning to FIG. 4D, at block 3, IHS 400 sends a request to startup data source 408 for the operating system and driver. Turning to FIG. 4E, at block 4, startup data source 408 provides IHS 400 with a copy of the operating system and the driver.

However, based on the security state of IHS 100, IHS 100 does not presume that the copies of the operating system and driver are authentic. Rather, IHS 100 presumes that, based on the connection to public network with captive portal access 402, that the copies may not be authentic.

Figure 4F:
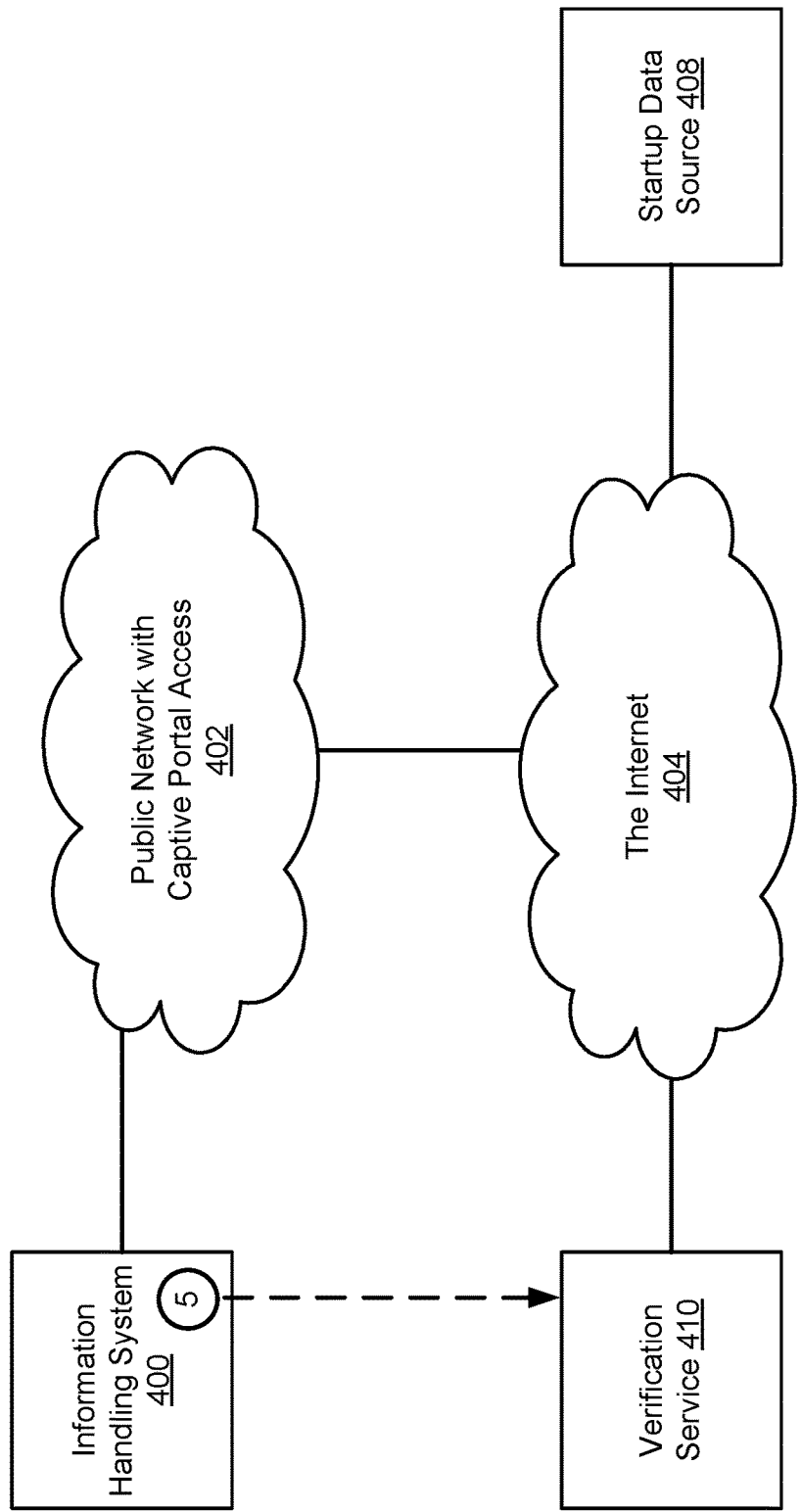
Figure 4G:
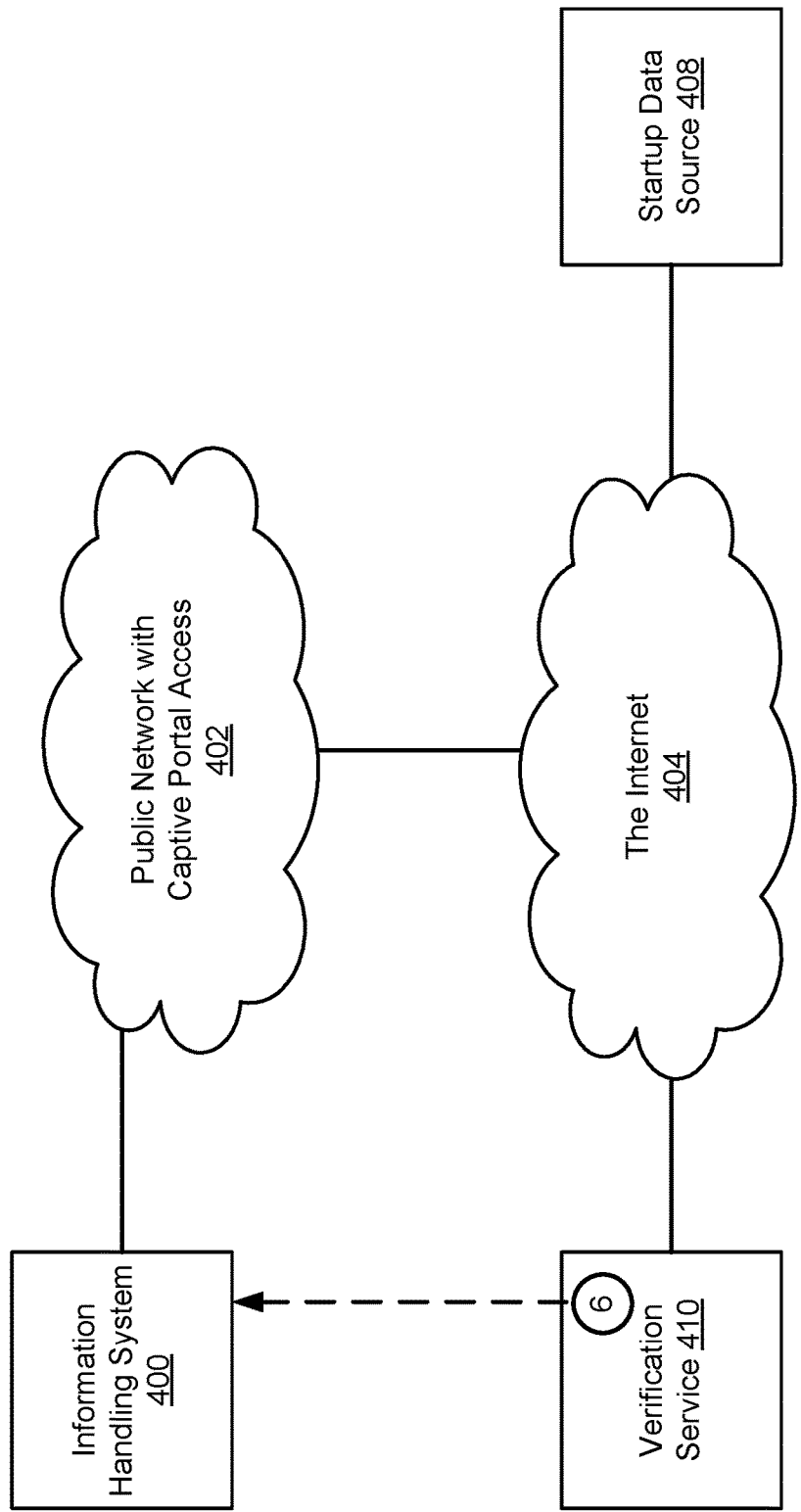

Turning to FIG. 4F, based on the security state, IHS 400 performs an action set including, at block 5, requesting verification data for the copies of the operating system and driver from verification service 410. Turning to FIG. 4G, at block 6, verification service 410 provides authentication data usable to cryptographically verify the copies of the operating system and the driver.

Using the authentication data, IHS 400 determines that both the copies can be cryptographically verified.

Figure 4H:
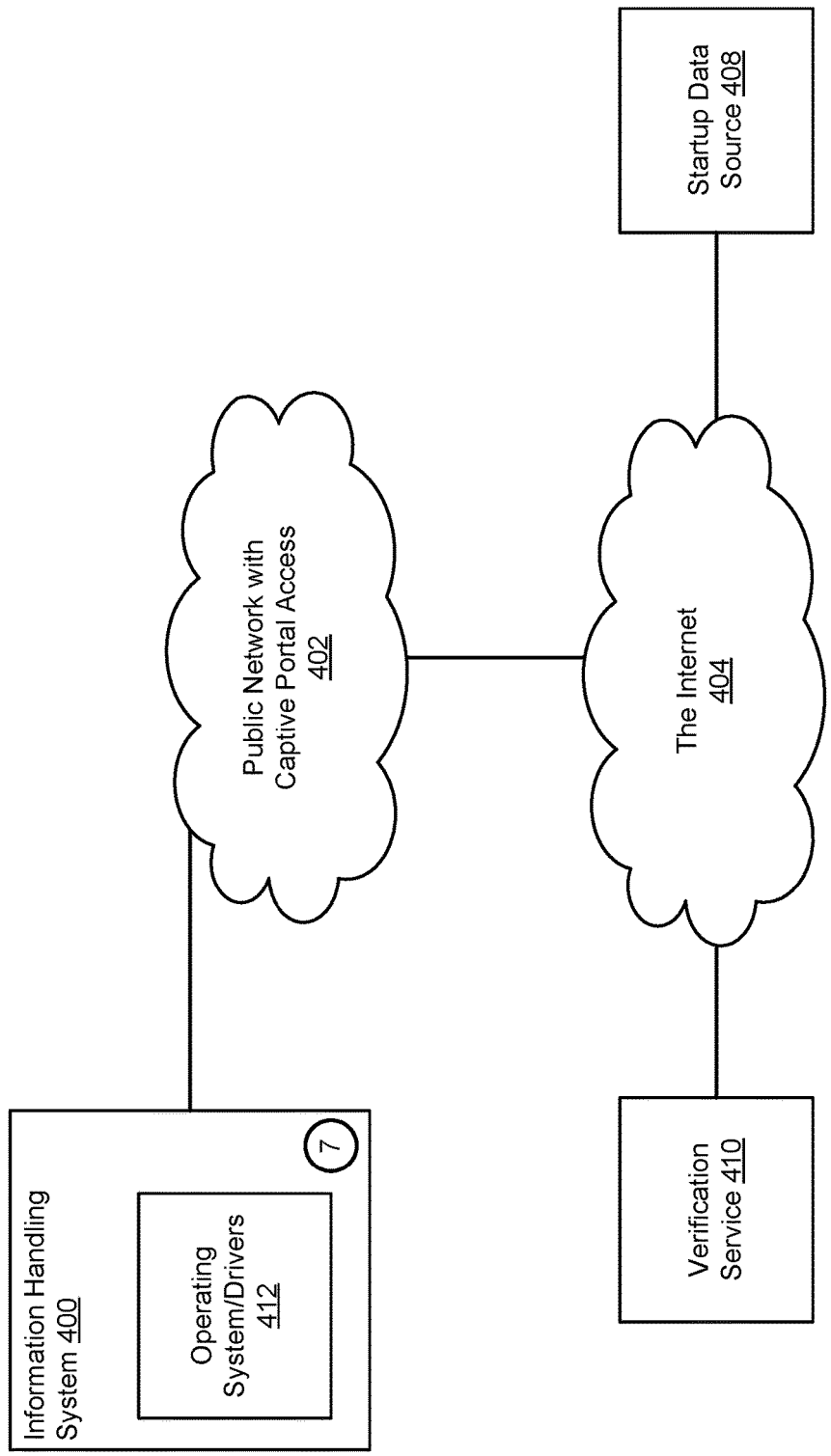

Turning to FIG. 4H, at operation 7, IHS 400 boots to the operating system/drivers 412. By cryptographically verifying the operating system and drivers prior to booting to them, IHS 400 may mitigate risk associated with its security state. Had the security state been of lower risk, IHS 400 may not have verified the operating system and drivers prior to booting to them.

Figure 5:
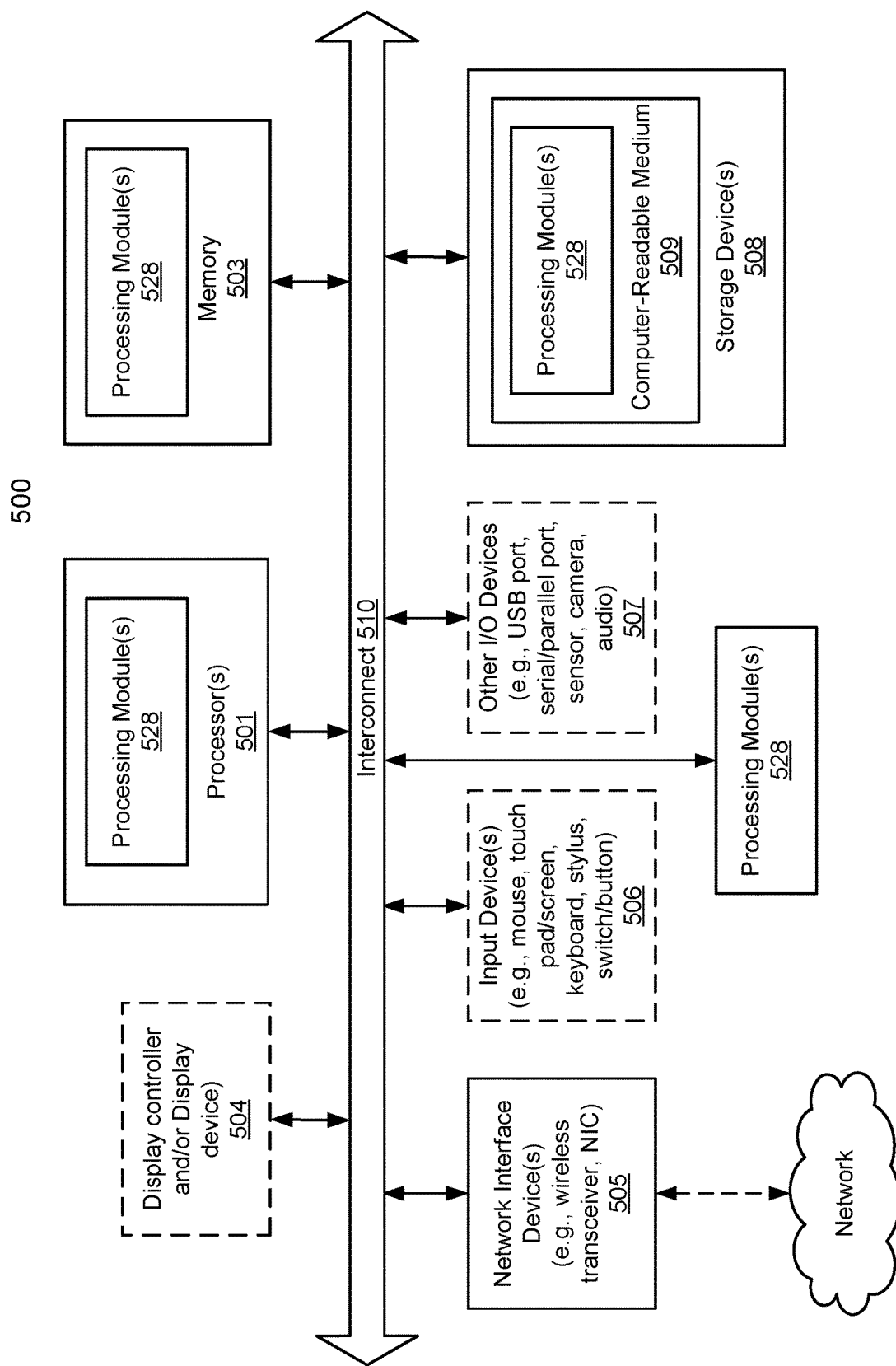
FIG. 5 shows a block diagram illustrating a computing device in accordance with an embodiment.

As discussed above, various components may be implemented with computing devices. For example, any of the components illustrated in FIGS. 1-4H may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for starting operation of an information handling system, the method comprising:
    initiating startup of the information handling system to boot to a management entity;
    prior to booting to the management entity:
        performing a multidimensional operation state check to identify a security state of the information handling system;
        making a determination regarding whether the security state indicates that the information handling system is potentially compromised;
        when it is determined that the information handling system is potentially compromised, performing an action set to manage a security risk indicated by the security state, wherein performing the action set to manage the security risk indicated by the security state comprises:
            obtaining startup data comprising components from one or more sources remote to the information handling system;
            obtaining a component list for the startup data and signatures for the components;
            making a second determination regarding whether all of the components in the component list are authorized for the information handling system; and
            when the second determination indicates that at least one of the components in the component list is not authorized, remediating the components in the components list; and
        when it is determined that the information handling system is not potentially compromised, booting the information handling system to the management entity.

2. The computer-implemented method of claim 1, wherein performing the multidimensional operation state check comprises:
    performing a secure boot state check to obtain a first metric;

performing a geographic location check to obtain a second metric;
performing a physical state check to obtain a third metric;
performing a network connectivity check to obtain a fourth metric; and
obtaining the security state using at least one of the first metric, the second metric, the third metric, and the fourth metric.

3. The computer-implemented method of claim 2, wherein performing the secure boot state check comprises identifying whether a security process for booting to the management entity has been attempted to be disabled.

4. The computer-implemented method of claim 2, wherein performing the geographic location check comprises:
identifying a geographic location of the information handling system;
making a comparison of the geographic location to a list of geographic locations; and
obtaining the second metric based on the comparison.

5. The computer-implemented method of claim 2, wherein performing the physical state check comprises:
inventorying hardware components of the information handling system;
making a comparison of the hardware components to a list of predetermined hardware components; and
obtaining the third metric based on the comparison.

6. The computer-implemented method of claim 2, wherein performing the physical state check comprises:
probing a serial peripheral interface bus to which a processor of the information handling system is operably connected to identify hardware components operably connected to the serial peripheral interface bus;
making a comparison of the identified hardware components to a list of predetermined hardware components; and
obtaining the third metric based on the comparison.

7. The computer-implemented method of claim 2, wherein performing the physical state check comprises:
reading a log hosted by the information handling system to obtain an access list, the log indicating physical access to a chassis of the information handling system; and
obtaining the third metric based on the access list.

8. The computer-implemented method of claim 2, wherein performing the network connectivity check comprises:
surveilling one or more networks to which the information handling system is operably connected to identify security standards employed by the one or more networks; and
obtaining the fourth metric based on the security standards.

9. The computer-implemented method of claim 1, wherein performing the action set to manage the security risk indicated by the security state further comprises:
when the second determination indicates that all of the components in the component list are authorized, performing a verification for the components.

10. The computer-implemented method of claim 9, wherein performing the verification for the components comprises:
making a third determination regarding whether the signatures are valid;
when the third determination indicates that the signatures are valid, performing a cryptographic validation of the components in the component list; and
when the cryptographic validation of the components in the component list is successful, booting the management entity with the components in the component list.

11. The computer-implemented method of claim 10, wherein performing the verification for the components further comprises:
when the cryptographic validation of the components in the component list is not successful, remediating the components in the components list.

12. The computer-implemented method of claim 9, wherein remediating the components in the components list comprises:
obtaining second startup data from the one or more sources remote to the information handling system, wherein the second startup data is obtained by:
obtaining a manifest from one of the one or more sources remote to the information handling system, the manifest comprising access information for the components in the components list; and
using the access information to download an additional copy of the components from the one or more sources remote to the information handling system.

13. The computer-implemented method of claim 1, wherein the management entity comprises an operating system and at least one driver for a hardware component of the information handling system.

14. The computer-implemented method of claim 1, wherein performing the action set to manage the security risk comprises:
preventing the information handling system from booting to the management entity when the security risk indicates a security risk that cannot be remediated by the information handling system.

15. The computer-implemented method of claim 1, wherein performing the action set to manage the security risk comprises:
booting to the management entity with one or more functionalities of the management entity being disabled.

16. The computer-implemented method of claim 1, wherein performing the action set to manage the security risk comprises:
obtaining multiple indicators of attack on the information handling system;
obtaining multiple indicators of compromise on the information handling system;
based on the multiple indicators of attack and the multiple indicators of compromise, selecting a threat level; and
obtaining a listing of one or more actions of the action set from a repository using the threat level as a key to perform a lookup for the listing.

17. A non-transitory machine-readable medium having instructions stored therein, which when executed by a processor, cause the processor to perform operations for starting operation of an information handling system, the operations comprising:
initiating startup of the information handling system to boot to a management entity;
prior to booting to the management entity:
performing a multidimensional operation state check to identify a security state of the information handling system;
making a determination regarding whether the security state indicates that the information handling system is potentially compromised;
when it is determined that the information handling system is potentially compromised, performing an action set to manage a security risk indicated by the security state, wherein performing the action set to manage the security risk indicated by the security state comprises:

obtaining startup data comprising components from one or more sources remote to the information handling system;

obtaining a component list for the startup data and signatures for the components;

making a second determination regarding whether all of the components in the component list are authorized for the information handling system; and when the second determination indicates that at least one of the components in the component list is not authorized, remediating the components in the components list; and when it is determined that the information handling system is not potentially compromised, booting the information handling system to the management entity.

18. The non-transitory machine-readable medium of claim 17, wherein performing the multidimensional operation state check comprises:

performing a secure boot state check to obtain a first metric;

performing a geographic location check to obtain a second metric;

performing a physical state check to obtain a third metric;

performing a network connectivity check to obtain a fourth metric; and obtaining the security state using at least one of the first metric, the second metric, the third metric, and the fourth metric.

19. An information handling system, comprising:

a hardware storage for storing startup data; and a processor adapted to execute instructions that configure the processor to:

initiate startup of the information handling system to boot to a management entity;

prior to booting to the management entity:

perform a multidimensional operation state check to identify a security state of the information handling system;

make a determination regarding whether the security state indicates that the information handling system is potentially compromised;

when it is determined that the information handling system is potentially compromised, perform an action set to manage a security risk indicated by the security state, wherein performing the action set to manage the security risk indicated by the security state comprises:

obtaining startup data comprising components from one or more sources remote to the information handling system;

obtaining a component list for the startup data and signatures for the components;

making a second determination regarding whether all of the components in the component list are authorized for the information handling system; and when the second determination indicates that at least one of the components in the component list is not authorized, remediating the components in the components list; and when it is determined that the information handling system is not potentially compromised, boot the information handling system to the management entity.

20. The information handling system of claim 19, wherein performing the multidimensional operation state check comprises:

performing a secure boot state check to obtain a first metric;

performing a geographic location check to obtain a second metric;

performing a physical state check to obtain a third metric;

performing a network connectivity check to obtain a fourth metric; and obtaining the security state using at least one of the first metric, the second metric, the third metric, and the fourth metric.

\* \* \* \* \*